United States Patent
van Schoor et al.

(10) Patent No.: US 6,802,216 B2
(45) Date of Patent: Oct. 12, 2004

(54) METHOD AND SHEET LIKE SENSOR FOR MEASURING STRESS DISTRIBUTION

(75) Inventors: Marthinus van Schoor, Medford, MA (US); Attila Lengyel, Cambridge, MA (US); Gert Johannes Muller, Norwood, MA (US); Brooks Radighieri, Sudbury, MA (US)

(73) Assignee: MIDE Technology, Medford, MA (US)

( * ) Notice: Subject to any disclaimer, the term of this patent is extended or adjusted under 35 U.S.C. 154(b) by 79 days.

(21) Appl. No.: 10/277,649

(22) Filed: Oct. 23, 2002

(65) Prior Publication Data

US 2003/0196485 A1 Oct. 23, 2003

Related U.S. Application Data

(60) Provisional application No. 60/373,096, filed on Apr. 16, 2002, and provisional application No. 60/373,058, filed on Apr. 16, 2002.

(51) Int. Cl.[7] ................................................. G01L 5/04
(52) U.S. Cl. ............................. 73/159; 73/160; 73/763; 73/788; 73/849; 73/850
(58) Field of Search .......................... 73/850, 159–160, 73/763, 781–808, 828, 849; 356/238.1

(56) References Cited

U.S. PATENT DOCUMENTS

| | | | |
|---|---|---|---|
| 3,552,856 A | * | 1/1971 | Schwallie .................. 356/32 |
| 3,789,657 A | | 2/1974 | Ching, Jr. et al. |
| 4,142,405 A | * | 3/1979 | Stevens ..................... 73/763 |
| 4,292,851 A | | 10/1981 | Brewer |
| 4,429,580 A | * | 2/1984 | Testa et al. ................ 73/768 |
| 4,482,784 A | | 11/1984 | Whetstone |
| 4,514,688 A | | 4/1985 | Whetstone |
| 4,637,263 A | | 1/1987 | Fritz et al. |
| 4,689,448 A | | 8/1987 | Snyder et al. |
| 4,744,252 A | | 5/1988 | Stout |
| 4,869,113 A | | 9/1989 | Sarrazin |
| 5,650,570 A | | 7/1997 | Goto et al. |
| 5,723,792 A | | 3/1998 | Miyazaki |
| 5,911,158 A | | 6/1999 | Henderson et al. |
| 6,109,115 A | | 8/2000 | Miyazaki |
| 6,148,675 A | | 11/2000 | Okano |

* cited by examiner

*Primary Examiner*—Edward Lefkowitz
*Assistant Examiner*—Alandra Ellington
(74) *Attorney, Agent, or Firm*—Iandiorio & Teska

(57) ABSTRACT

A method and sheet-like sensor for measuring stress distribution including a grid of members which change in resistance when subjected to strain, the members intersecting at internal nodes and intersecting at boundary nodes at the periphery of the grid defining a plurality of legs. An analyzer is electrically connected only to the boundary nodes and configured to calculate any change in resistance in all of the legs based solely on the measured resistance of the legs between the boundary nodes.

42 Claims, 25 Drawing Sheets

GRID WITH GENERAL IMPEDANCES AS LEG ELEMENTS.

SURFACE STRAIN SHAPES (LEFT=XX, MIDDLE=YY, RIGHT=XY).

SHEER STRESS SENSOR

METHOD AND SHEET LIKE SENSOR FOR MEASURING STRESS DISTRIBUTION

RELATED APPLICATIONS

This application claims priority of U.S. Provisional application serial No. 60/373,096 filed Apr. 16, 2002 and U.S. Provisional application serial No. 60/373,058 filed Apr. 16, 2002.

FIELD OF THE INVENTION

This invention relates to a sheet-like sensor for, inter alia, measuring stress distribution experienced by structural components and to a method for measuring resistances in a network or grid of resistances.

BACKGROUND OF THE INVENTION

It is known in the art that certain materials exhibit a change in electrical resistance as a function of strain experienced by a material. A grid of members (e.g., copper wires) which change in resistance as a function of strain can be constructed and bonded to or integrated with a structural element (e.g., an aircraft wing) to detect the stresses experienced by the structural element. But, electrical connections must be made to each node of the grid. For large systems with many nodes, the sheer number of electrical connections becomes unwieldy as do the computations required to measure the change in resistance of all the legs between the nodes.

U.S. Pat. No. 5,650,570, incorporated herein by this reference, discloses a sheet-like sensor with amorphous iron-based alloy members woven into glass cloth layers separated by an insulating sheet and covered by synthetic rubber sheets. The members of the first cloth layer run parallel to each other and the members of the second cloth layer run parallel to each other but perpendicular to the members of the first cloth layer. One end of all the members of the first cloth layer are electrically connected to a first scanner and the other end of all of the members of the first cloth layer are electrically connected to a first impedance analyzer. One end of all of the members of the second cloth layer are electrically connected to a second scanner and the other end of all of the members of the second cloth layer are electrically connected to a second impedance analyzer. In this way, the change in resistance along the length of any member due to strain can be measured and the strain computed.

Unfortunately, the specific location of the strain experienced by the sensor cannot be detected. The same is true if a member fails: the sensor cannot identify the specific location of a failure. Moreover, the maximum strain that can be computed is limited by the failure strain of the ferromagnetic elements used which is between 0.2% and 0.4%. Finally, the method disclosed in the '570 patent cannot accurately predict the stress distribution of a structural component since it only provides an estimate of where a force or pressure is applied.

SUMMARY OF THE INVENTION

It is therefore an object of this invention to provide improved sheet-like sensor for measuring stress distribution.

It is a further object of this invention to provide such a sensor which reduces the number of electrical connections required to filly analyze the stress experienced by a structural component.

It is a further object of this invention to provide such a sensor in which no electrical connections are required internal to the sensor to fully analyze the full stress distribution.

It is a further object of this invention to provide such a sensor which is capable of detecting the specific location of the strains experienced by the sensor.

It is a further object of this invention to provide such a sensor which is capable of identifying the specific location of a failure.

It is a further object of this invention to provide such a sensor which is able to measure strains of a higher magnitude.

It is a further object of this invention to provide such a sensor which can fully predict stress distribution.

It is a further object of this invention to provide a method of determining all of the impedances of a grid of leg impedances.

It is a further object of this invention to provide such a method useful in connection with a sheet-like sensor or in connection with analyzers of other electrical circuits.

This invention results from the realization that a better, less cumbersome, more accurate, and more useful sheet-like sensor is effected by arranging members which change resistance as a function of strain as a grid forming legs between both internal and external nodes but only connecting the resistance measurement analyzer to the boundary nodes and then determining all of the leg resistances based on the measured resistances of the legs between the boundary nodes using an iterative algorithm. In this way, the electrical interconnections between the analyzer and the internal nodes of the grid are eliminated thus seriously reducing the number of electrical interconnections required. Moreover, the specific location of any strains experienced by the sensor can be more accurately detected, the specific location of any failure can be identified, and full stress distribution of a structural member or component underlying the sensor can be predicted. In addition, by using pseudoelastic shape memory alloy material instead of ferromagnetic materials, strains of a higher magnitude can be measured. This invention also results from the realization that the algorithm used in connection with the analyzer of the sheet-like sensor can be used in other environments, e.g., for evaluating electrical circuits.

This invention features a sheet-like sensor for measuring stress distribution typically comprising a grid of members which change in resistance when subjected to strain, the members intersecting at internal nodes and intersecting at boundary nodes at the periphery of the grid defining a plurality of legs. An analyzer is electrically connected only to the boundary nodes and configured to calculate any change in resistance in all of the legs based solely on the measured resistance of the legs between the boundary nodes.

In one example, the members are copper wires. In another example, the wires are made of pseudoelastic shape memory alloy material. The grid of members may be encapsulated in an encapsulation material such as Kapton. In this way, the analyzer can be formed as a circuit integral with the encapsulation material. The grid may be in the shape of a polygon, e.g., a rectangle or a square. Other shapes and designs, however, are possible Typically, the analyzer is configured to measure the resistances of the legs between the boundary nodes, to estimate the resistances of all of the legs, calculate the resistances of all of the legs based on the measured resistances of the legs between the boundary nodes and the estimated resistances of all of the legs, and to compare the calculated resistances of the legs between the boundary nodes with the measured resistances of the legs between the boundary nodes. Based on the comparison, a re-estimate of the resistances of all of the legs is made. Then, iterations of these steps are performed until the measured resistances of the legs between the boundary nodes converge to the calculated resistances of the legs between the boundary nodes to thus accurately determine the resistances of the legs between or connected to the internal nodes.

In one example, the analyzer is further configured to calculate the strain experience by each leg. Also, the analyzer may be further configured to identify any leg which has failed based on a very high determined resistance. Typically, the initial estimate is based on the measured resistances, e.g., the initial estimate is set to the mean of the measured resistances. Also, relaxation techniques may be used.

A sheet-like sensor for measuring stress distribution in accordance with this invention typically includes a grid of members which change in resistance when subjected to strain, the members intersecting at internal nodes and intersecting at boundary nodes at the periphery of the grid defining a plurality of legs. An analyzer is connected only to the boundary nodes. In the preferred embodiment, the analyzer is configured to measure the resistances of the legs between the boundary nodes and estimate the resistances of all of the legs, calculate the resistances of all of the legs based on the measured resistances of the legs between the boundary nodes and the estimated resistances of all of the legs. The calculated resistances of the legs between the boundary nodes is compared with the measured resistances of the legs between the boundary nodes. Based on the comparison, a re-estimate of the resistances of all of the legs is made, and iterations continue until the measured resistances of the legs between the boundary nodes converge to the calculated resistances of the legs between the boundary nodes. In this way, the resistances of the legs between or connected to the internal nodes is accurately determined.

This invention also features a sensor system or method for a grid including internal nodes and boundary nodes at the periphery of the grid defining a plurality of legs in which a characteristic of the legs between the boundary nodes is measured, the same characteristic of all of the legs is estimated, and the same characteristic of all of the legs is calculated based on the measured characteristic of the legs between the boundary nodes and the estimated characteristic of all of the legs. Next, a comparison is made between the calculated characteristic of the legs between the boundary nodes and the measured characteristic of the legs between the boundary nodes. Based on the comparison, the characteristic of all of the legs is again estimated, and iterations continue until the measured characteristic of the legs between the boundary nodes converge to the calculated characteristic of the legs between the boundary nodes. In one example, the members change in resistance when subjected to strain and the characteristic analyzed is resistance which varies as a function of strain. In one example, the characteristics are complex impedances.

One exemplary method for determining impedances in a grid of leg impedances in accordance with this invention includes: a) measuring the resistances of the legs between the boundary nodes, b) estimating the resistances of all of the legs, c) calculating the resistances of all of the legs based on the measured resistances of the legs between the boundary nodes and the estimated resistances of all of the legs, d) comparing the calculated resistances of the legs between the boundary nodes with the measured resistances of the legs between the boundary nodes, e) based on the comparison, re-estimating the resistances of all of the legs, and f) iteratively repeating steps c)–e) until the measured resistances of the legs between the boundary nodes converge to the calculated resistances of the legs between the boundary nodes to thus accurately determine the resistance of the legs between or connected to the internal nodes. Further included may the steps of calculating the strain experience by each leg, and identifying any leg which has failed based on a very high determined resistance. Typically, the estimate of step b) is based on the step a), (e.g., the estimate is set to the mean of the measured resistances). Also, a relaxation technique may be used in step f).

A sheet-like sensor for measuring stress distribution in accordance with this invention may include a grid of members which change in resistance when subjected to strain, the members intersecting at internal nodes and intersecting at boundary nodes at the periphery of the grid defining a plurality of legs and means, such as an analyzer, connected only to the boundary nodes, for calculating any change in resistance in all of the legs based solely on the measured resistance of the legs between the boundary nodes.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENTS

Figure 1:
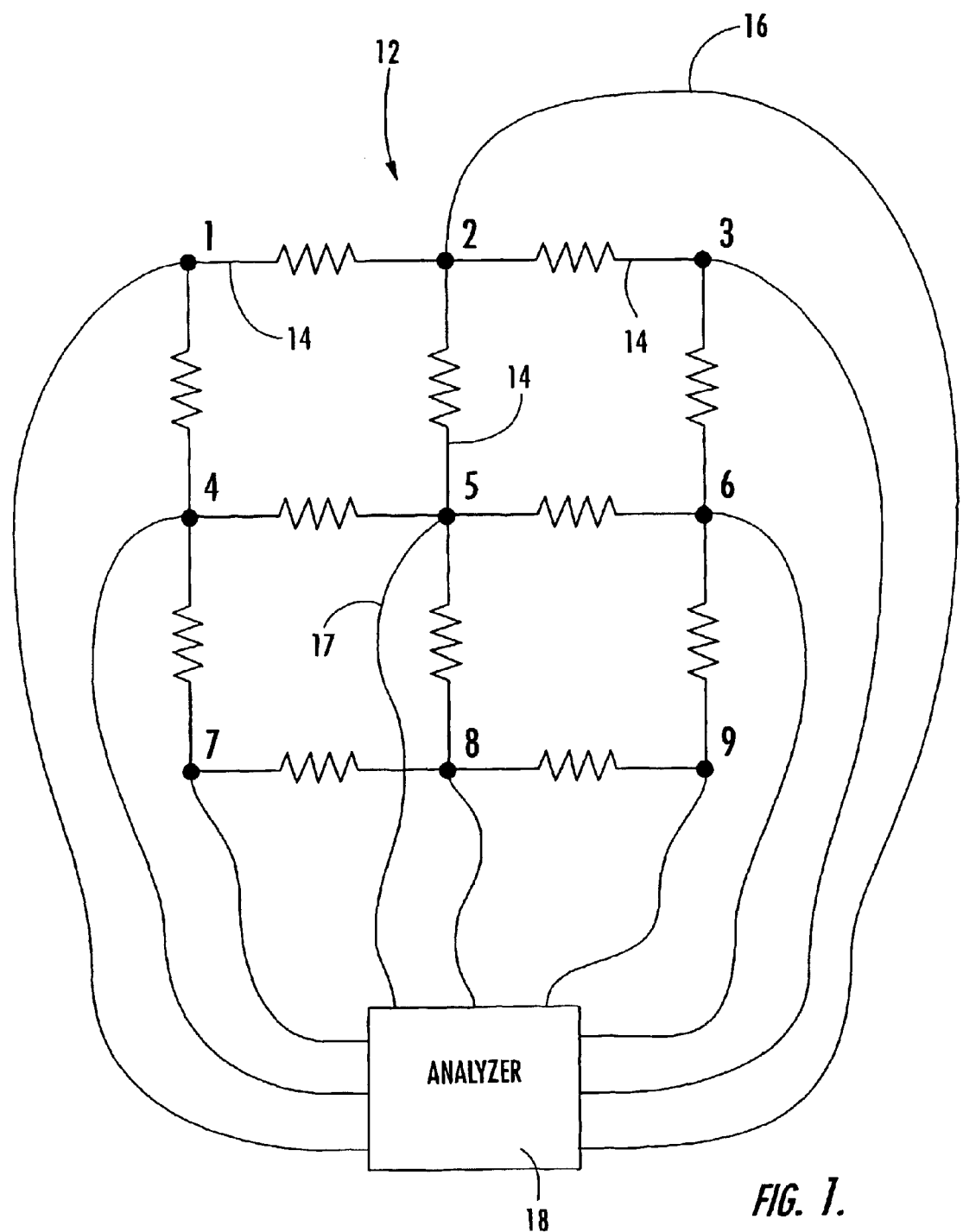
FIG. 1 is a schematic view of a proposed grid showing the requirement of electrical interconnections between the analyzer and the internal nodes of the grid.

Aside from the preferred embodiment or embodiments disclosed below, this invention is capable of other embodiments and of being practiced or being carried out in various ways. Thus, it is to be understood that the invention is not limited in its application to the details of construction and the arrangements of components or steps set forth in the following description or illustrated in the drawings.

Proposed sensor 10, FIG. 1 includes grid 12 of members 14 which change in resistance when subjected to strain. Node 5 is an "internal" node, nodes 1–4 and 6–9 are "boundary" nodes. By connecting wires or other electrical interconnects to each node (see wire 16 connected between node 2 and analyzer 18, and wire 17 connected between node 5 and analyzer 18), analyzer 18 can be configured to calculate any change in resistance due to strain experienced by each leg of the grid and ultimately the strain experienced by each leg.

As delineated in the Background section above, one problem with this arrangement is the need for wires or electrical interconnects connected to all of the nodes. For N×M nodes (in FIG. 1, 3×3 nodes) there must at least N×M wires. In a practical system, N and M may each be 100 or more resulting in at least 10,000 wires or electrical interconnections. When such a system is formed as sheet-like sensor disposed on or integral with a structure, such as a large aircraft wing, the large number of electrical interconnections becomes unwieldy as does the computations required to be carried out by analyzer 18 to measure the change in resistance of all of the legs between all of the nodes.

Note, however, that for a system with 10,000 nodes, there are only 2M+2N−4 boundary nodes or 396 boundary nodes. If any change in resistance of all the legs between the 10,000 nodes could be detected via wires or electrical interconnections connected to only the 396 boundary nodes, there would be 9,604 less wires or electrical interconnections greatly reducing the complexity and cost of the system.

Figure 2:
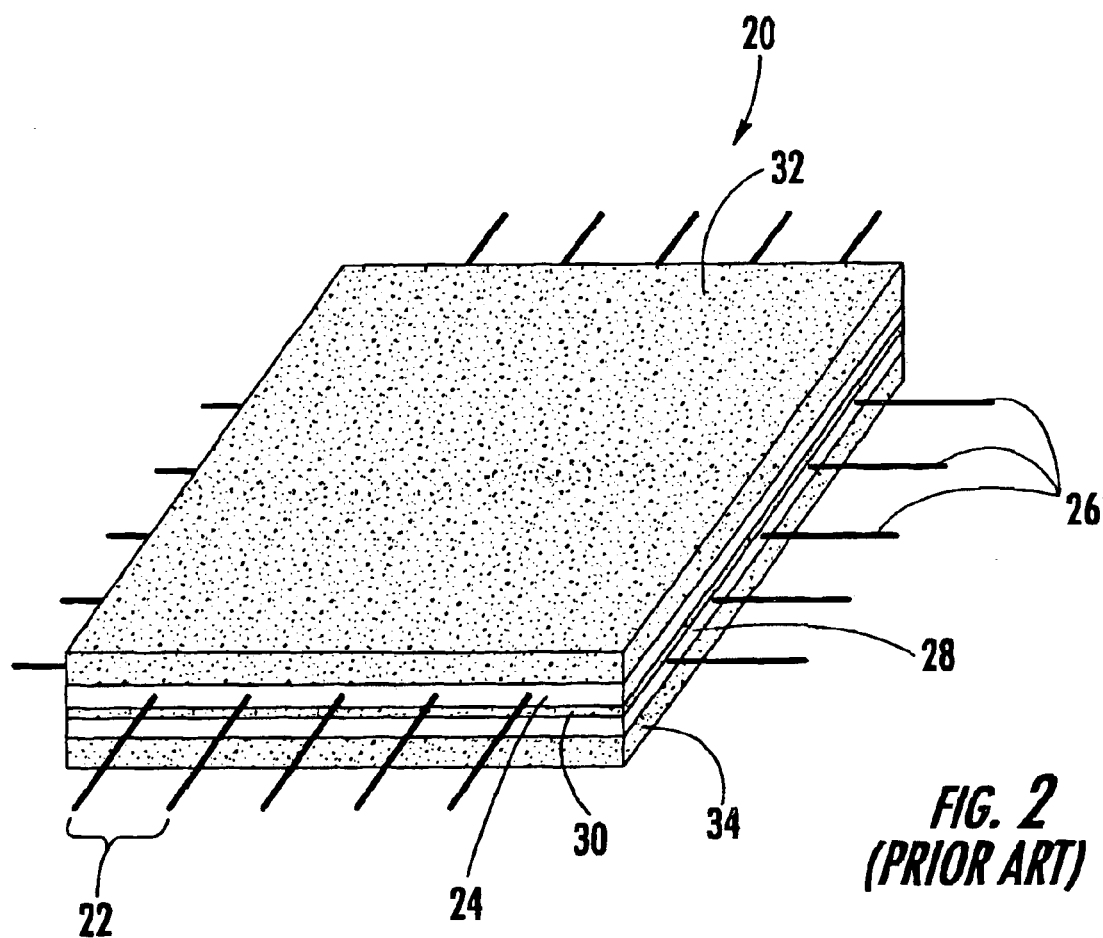
FIG. 2 is a schematic three dimensional view showing the prior art sheet-like sensor of U.S. Pat. No. 5,650,570.

Disclosed in U.S. Pat. No. 5,650,570 is sheet-like sensor 20, FIG. 2 with parallel amorphous iron-based alloy members 22 woven in glass cloth layer 24 and similar parallel members 26 woven in glass cloth layer 28 but running perpendicular to members 22. Insulating sheet 30 separates and electrically isolates layers 24 and 28 and the respective woven-in members. Synthetic rubber sheets 32 and 34 cover layers 24 and 28, respectively.

Note that no nodes are formed. Thus, when an electrical connection is made between each end of each member 22 and between each end of members 26 to separate analyzers (see FIG. 25 of the '570 patent), any change in resistance along the length of a given member due to stress can be detected but not the specific location of the stress in all cases, for example, if only one member of layer 28 experiences stress. The same is true if one member fails at some point along its length: the system can not then identify the specific location of the failure. Moreover, the system of the '570 patent cannot accurately predict the full stress distribution since it only provides an estimate of where a force or pressure is applied. Also, the need for the insulating sheet between the two glass cloth layers results in a thicker and more unwieldy sheet-like sensor.

Figure 3:
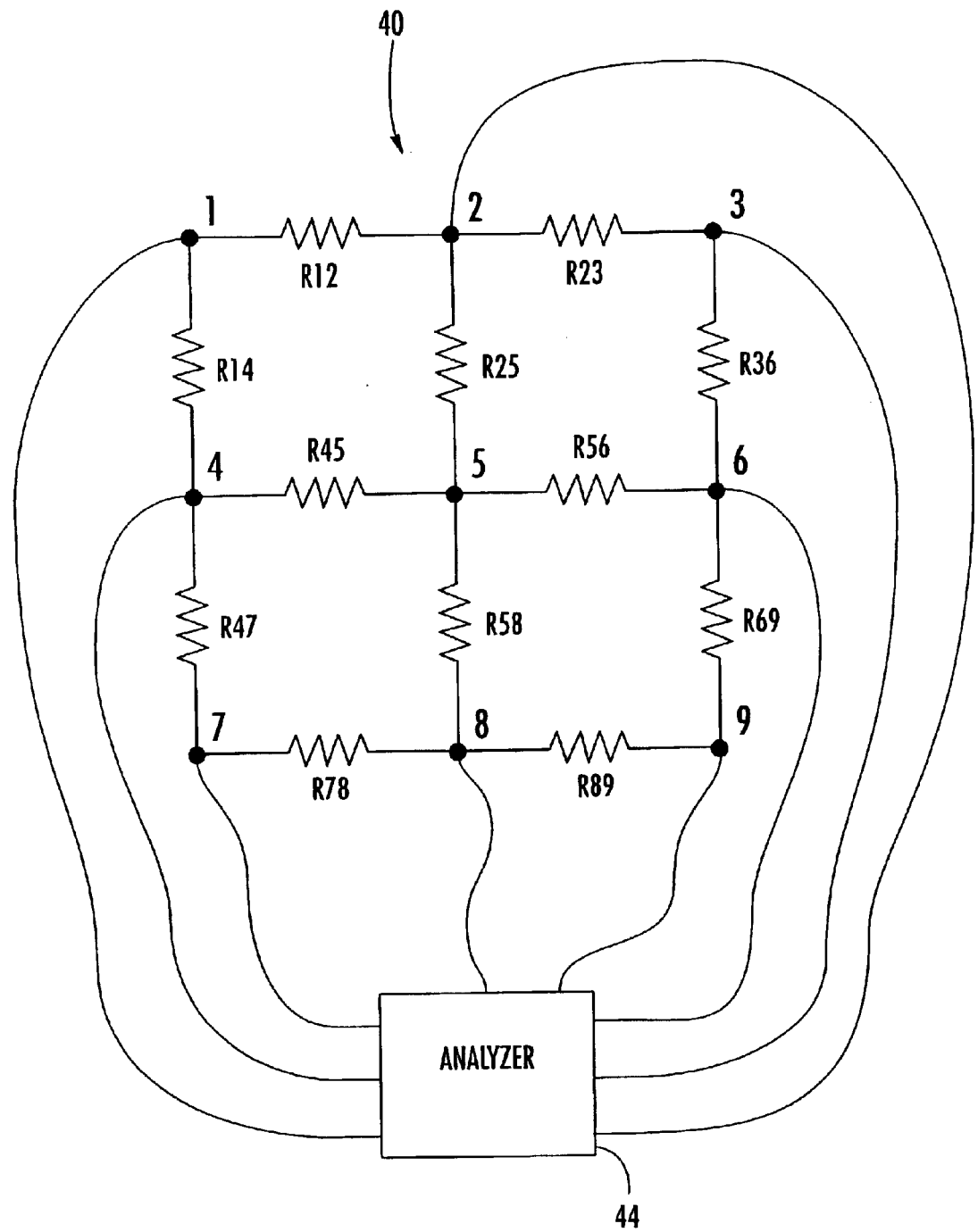
FIG. 3 is a schematic view showing how, in the sensor of the subject invention, no electrical interconnections need exist between the analyzer and the internal nodes of the grid.

In the subject invention, in contrast, stress locations can be precisely determined and measured by only attaching wires, leads, or other electrical interconnections to the boundary nodes of the sheet-like sensor. As shown in FIG. 3, simplified sheet-like sensor 40 includes a grid of members which change in resistance when subject to strain. Unlike the system disclosed in the '570 patent, the members intersect at internal node 5 and intersect at boundary nodes 1–4 and 6–9 at the periphery of the grid and thus define legs having a variable resistance as a function of strain. Thus, $R_{ij}$ is the resistance of a leg between nodes i and j. The members or legs interconnecting the nodes are typically copper wires or wires made of a pseudoelastic shape memory material such as Niton. The members may also be traces etched, sputtered, laser machined, or otherwise formed on a substrate.

Unlike the system shown in FIG. 1, no electrical connections need be made to internal node 5 in order to determine the change in resistance of all of the legs. Thus, in a typical system, with, for example, 10,000 total nodes, there are only 396 boundary nodes and thus at least 9,604 fewer connections than the system of FIG. 1. The result is a less complex, more reliable, and easier to deploy sensor sheet.

Analyzer 44 is configured to calculate any change in resistance in all of the legs based solely on the measured resistances of the legs between the boundary nodes. For example, in system 40', FIG. 4, electrical interconnections need not be connected to internal nodes 7–9, 12–14, or 17–19 in order to accurately calculate any change in resistance of any of the legs including the legs between the internal nodes or between a boundary node and an internal node.

Figure 5A:
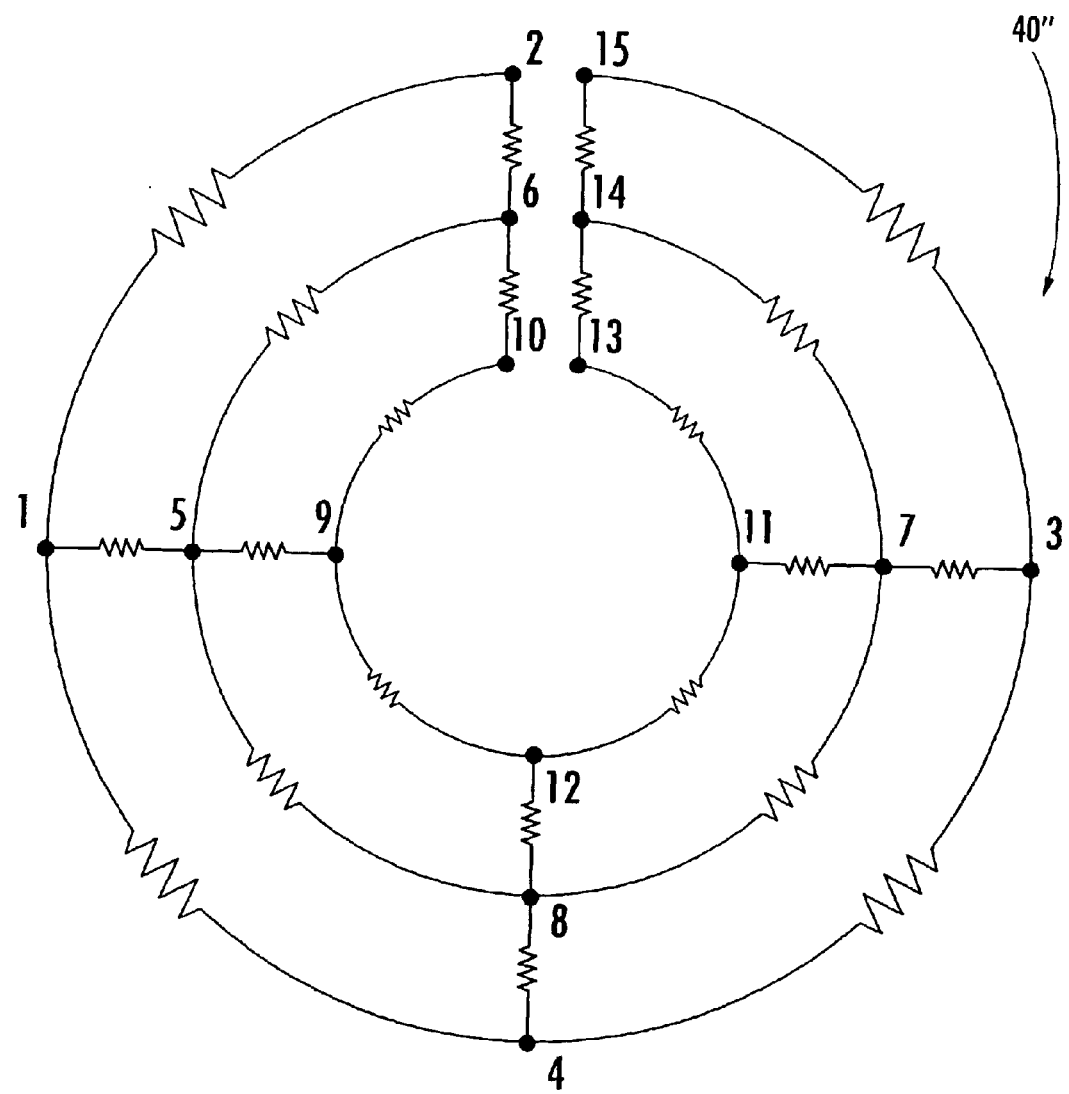
FIGS. 5A–5B are schematic views showing other grid configurations in accordance with the subject invention.
Figure 5B:
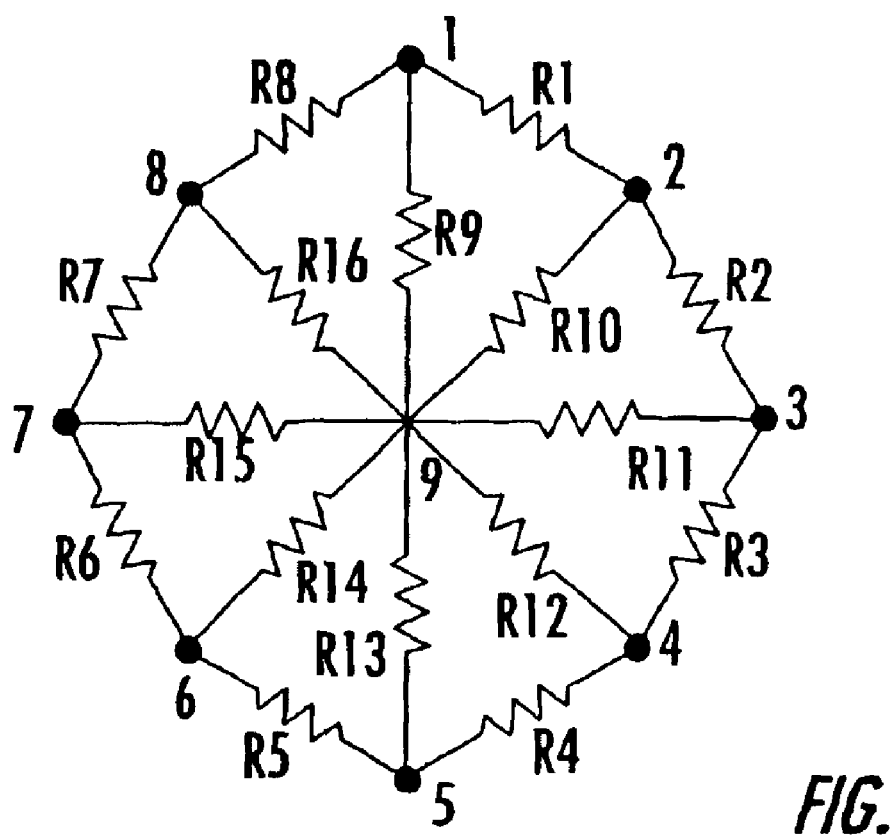

The subject invention is not limited to polygonal, rectangular, or square configurations, however. In system 40", FIG. 5A, no electrical interconnections are required for internal nodes 5, 9, 8, 12, 7 and 11 in order to calculate any change in resistance of all of the legs of the grid shown. In FIG. 5B, another circular configuration is shown with a single internal node 9.

Figure 6:
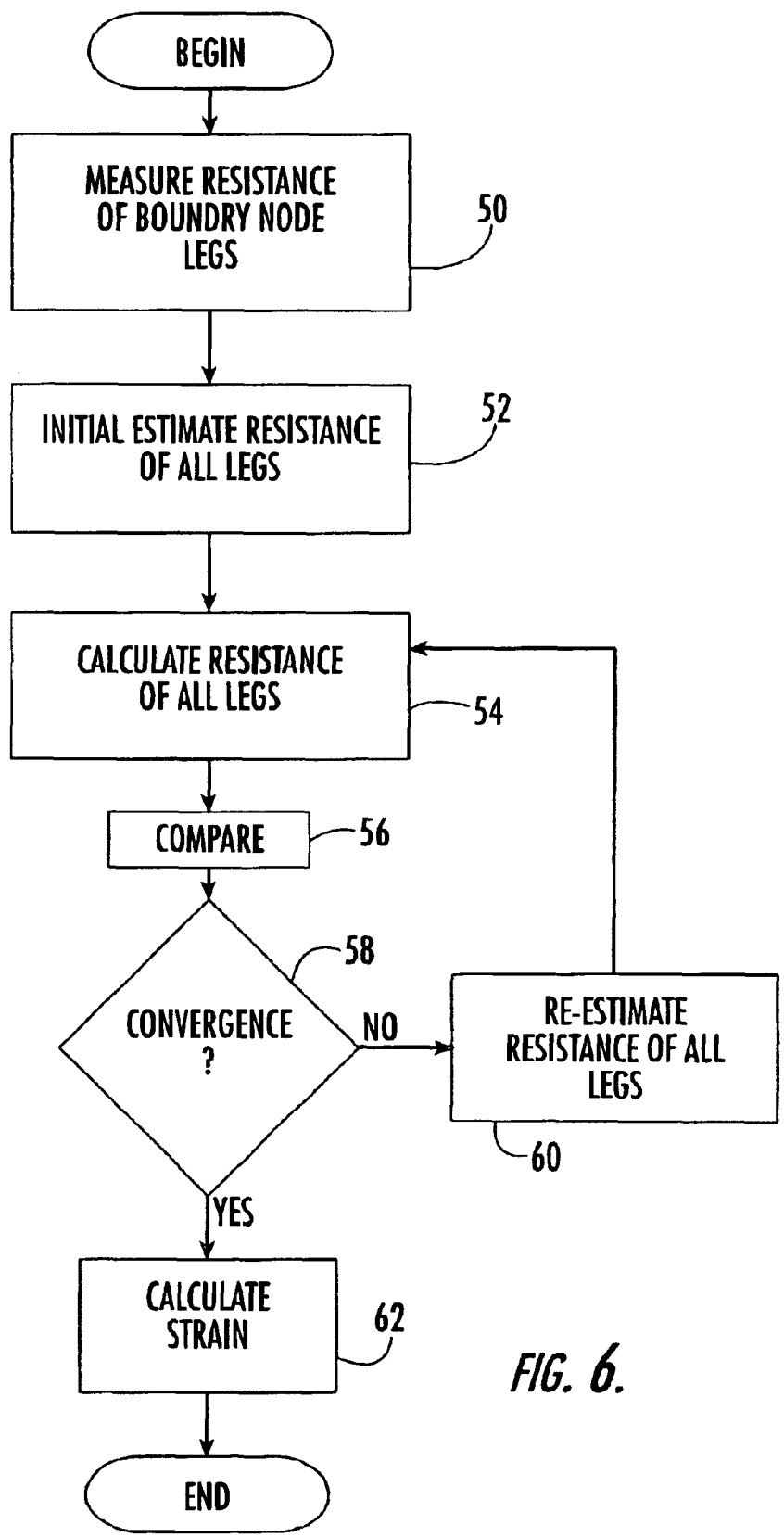
FIG. 6 is a flow chart depicting the primary steps associated with the method of calculating strains in accordance with the subject invention.

Returning again to FIG. 3 for simplicity and to FIG. 6, means such as analyzer 44, FIG. 3, or any computation device or set of devices or equivalent, is electrically connected only to boundary nodes 1–4 and 6–9 as shown and is configured, programmed, or adapted to first measure the resistance of the legs between the boundary nodes represented by $R_{12}$, $R_{23}$, $R_{36}$, $R_{69}$, $R_{89}$, $R_{78}$, $R_{47}$, and $R_{14}$, step 50, FIG. 6. Estimates are then made for the resistances of all of the legs including the legs represented as $R_{25}$, $R_{45}$, $R_{56}$, and $R_{58}$ in FIG. 3, step 52, FIG. 6. Preferably, the estimates are made in such a way that they are as close as possible to the actual leg resistances to advance convergence. One method for making initial estimates for $R_{25}$, $R_{45}$, $R_{56}$, and $R_{58}$ and the other leg resistances includes setting them all to the mean of the measured leg resistances between the boundary nodes.

Next, by knowing a) the resistive network or grid configuration and layout, b) the measured resistances of the legs between the boundary nodes, and c) the estimated resistances of all of the legs, the resistance of all of the legs is calculated, step 54, FIG. 6, using i) the fact that at each node the net current flow is zero and that ii) the voltage drop is a known function of resistance and current for a particular leg material.

Then, the calculated resistances of the legs between the boundary nodes is compared, step 56, with the measured resistance of the legs between the boundary nodes. Based on this comparison, at step 60, a new estimate is made for the resistances of all of the legs. If convergence has not occurred at step 58, steps 54, 56, 58, and 60 are again carried out until convergence occurs whereupon the measured resistances of the legs between the boundary nodes ($R_{12}$, $R_{23}$, $R_{36}$, $R_{69}$, $R_{89}$, $R_{78}$, $R_{47}$, and $R_{14}$, FIG. 3) at step 50, FIG. 6 converge to the calculated resistances of these same legs. When this occurs, the calculated resistances of the legs connected to any internal node (legs $R_{45}$, $R_{25}$, $R_{56}$, and $R_{58}$, FIG. 3) or between internal nodes (see FIGS. 4–5) are accurately determined.

Once all the resistances are known and, more specifically, when there is a change in resistance of one or more of the legs due to strain, the resulting strain can be easily calculated step 62, FIG. 6. Also, if any leg resistances are determined to be extremely high or infinity, a failed leg condition can be identified.

Figure 4:
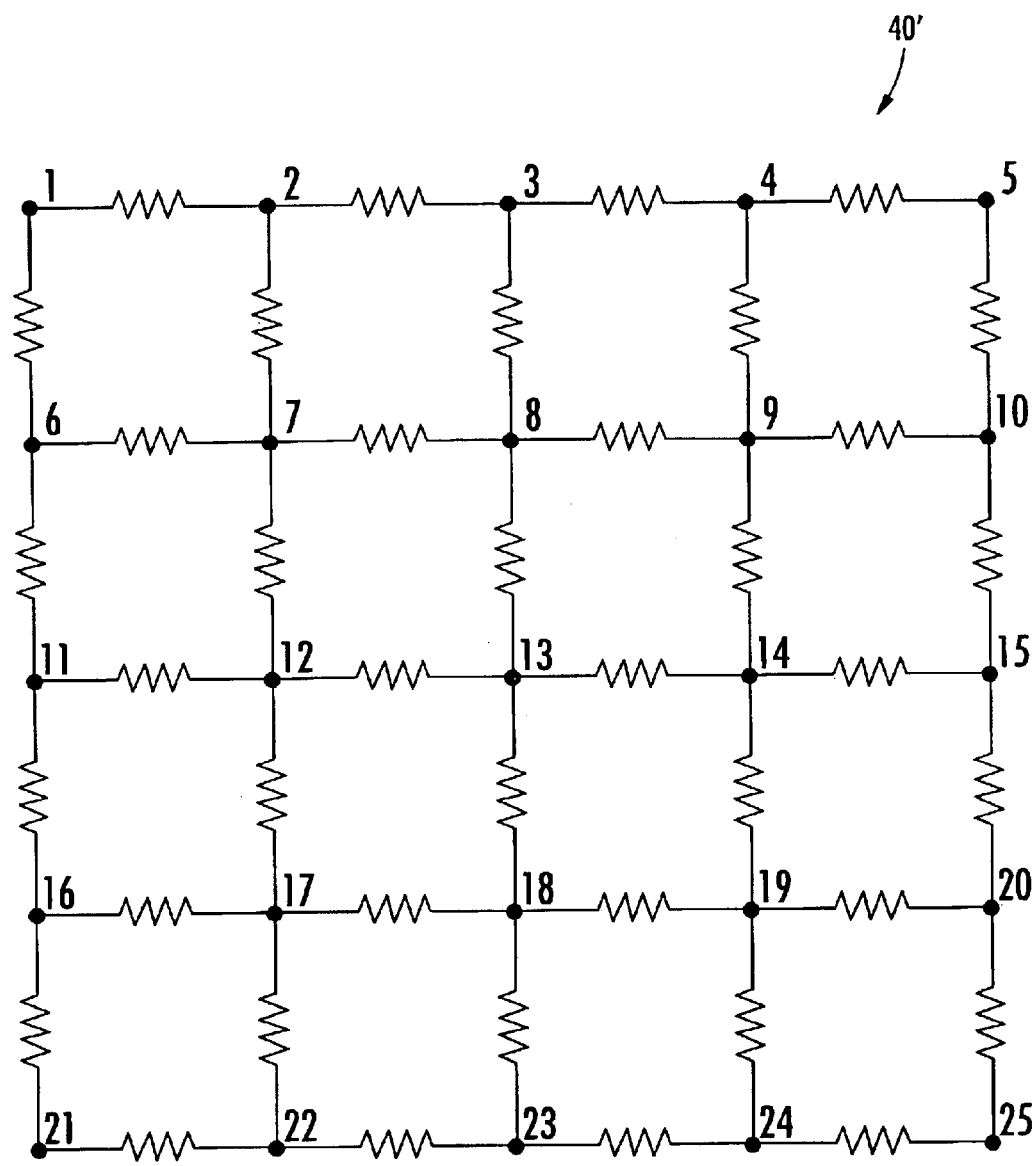
FIG. 4 is a schematic view of a larger grid in accordance with the subject invention.
Figure 7:
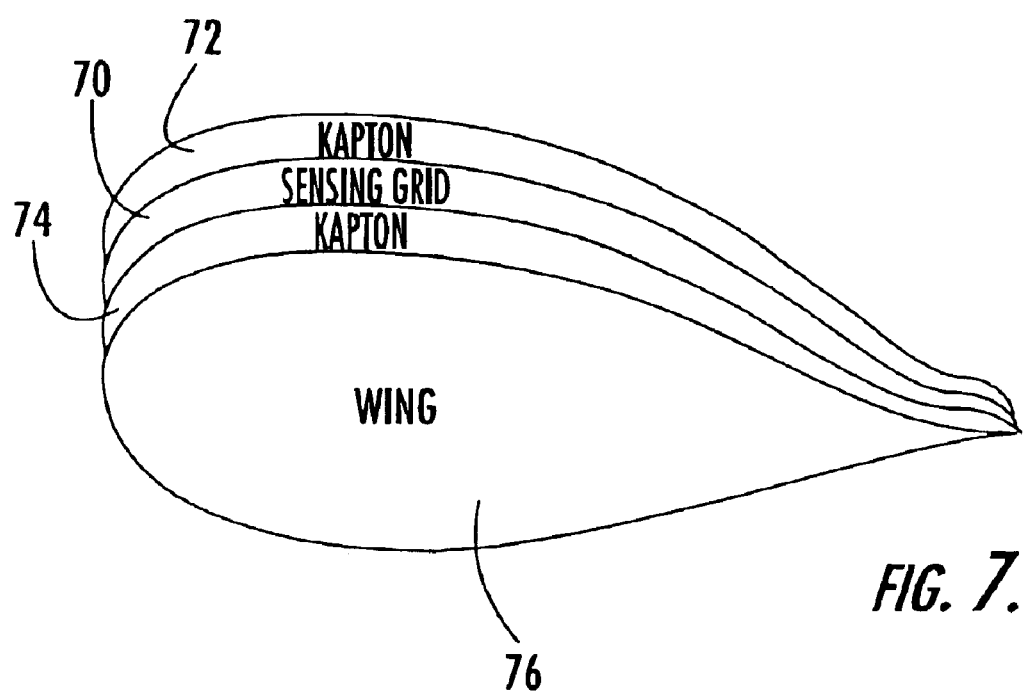
FIG. 7 is a schematic cross-sectional view showing a sensor in accordance with the subject invention disposed on an aircraft wing for measuring stresses experienced thereby.

In a typical system, the sheet-like sensor of FIGS. 3–5 as represented by sensing grid 70, FIG. 7 is encapsulated in a flexible encapsulation material such as Kapton layers 72 and 74 and laid on a structure whose stress distribution is to be measured, for example, aircraft wing 76. Indeed, the circuitry of analyzer 44, FIG. 3 may be integrated with Kapton layer 72 and/or 74. And, the complete sensor can be integrated with the structure itself. For example, if wing 76 is made of plies of composite material, grid 70 can be integrated as one of the plies.

Examples of the Analysis Methods

Figure 8:
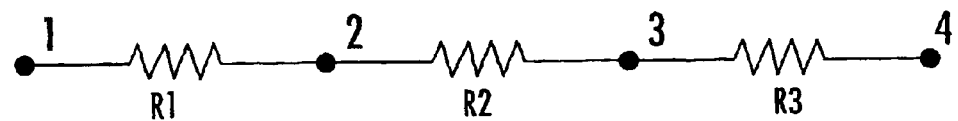
FIG. 8 is an explanatory circuit diagram showing a simple network of resistors in series.

This section provides the theory of how the internal voltages and currents in a grid with known leg resistances can be determined. Making use of two simple examples best does this. Consider the simple network of resistors in series of FIG. 8.

Using standard electrical network theory, the following equations hold.

The voltage drop over Resistance $R_{12}$ is:

$$\Delta V_{21} = V_2 - V_1 = I_1 R_1, \quad (1)$$

the voltage drop over Resistance $R_{23}$ is:

$$V_3 - V_2 = I_2 R_2, \text{ and} \quad (2)$$

the voltage drop over Resistance $R_{34}$ is:

$$V_4 - V_3 = I_3 R_3. \quad (3)$$

At the nodes, the net current flow must be zero. Thus, at node 2

$$I_1 - I_2 = 0, \text{ and} \quad (4)$$

at node 3, $$I_2 - I_3 = 0 \quad (5)$$

The unknowns $I_1$, $I_3$, $I_4$, $V_2$, $V_3$ can be determined from equations (1) through (5) when a voltage is applied across nodes 1 and 4 and when $V_1$ and $V_4$ are known. Equations (1) through (5) can be placed into matrix form, which yields:

$$\begin{bmatrix} -1 & 1 & 0 & 0 \\ 0 & -1 & 1 & 0 \\ 0 & 0 & -1 & 1 \\ 0 & 0 & 0 & 0 \\ 0 & 0 & 0 & 0 \end{bmatrix} \begin{Bmatrix} V_1 \\ V_2 \\ V_3 \\ V_4 \end{Bmatrix} = \begin{bmatrix} R_1 & 0 & 0 \\ 0 & R_2 & 0 \\ 0 & 0 & R_3 \\ 1 & -1 & 0 \\ 0 & 1 & -1 \end{bmatrix} \begin{Bmatrix} I_1 \\ I_3 \\ I_4 \end{Bmatrix} \quad (6)$$

In order to solve this set of equations for the unknowns, the equations are re-organized as shown in Equation (7):

$$\begin{bmatrix} 1 & 0 & -1 & 0 \\ -1 & 1 & 0 & 0 \\ 0 & -1 & 0 & 1 \\ 0 & 0 & 0 & 0 \\ 0 & 0 & 0 & 0 \end{bmatrix} \begin{Bmatrix} V_2 \\ V_3 \\ V_1 \\ V_4 \end{Bmatrix} = \begin{bmatrix} R_1 & 0 & 0 \\ 0 & R_3 & 0 \\ 0 & 0 & R_4 \\ 1 & -1 & 0 \\ 0 & 1 & -1 \end{bmatrix} \begin{Bmatrix} I_1 \\ I_3 \\ I_4 \end{Bmatrix} \quad (7)$$

and then the unknowns can be calculated from:

$$\begin{bmatrix} \begin{bmatrix} 1 & 0 \\ -1 & 1 \\ 0 & -1 \end{bmatrix} & \begin{bmatrix} -1 & 0 \\ 0 & 0 \\ 0 & 1 \end{bmatrix} \\ \begin{bmatrix} 0 & 0 \\ 0 & 0 \end{bmatrix} & \begin{bmatrix} 0 & 0 \\ 0 & 0 \end{bmatrix} \end{bmatrix} \begin{Bmatrix} V_2 \\ V_3 \\ V_1 \\ V_4 \end{Bmatrix} = \begin{bmatrix} \begin{bmatrix} R_1 & 0 & 0 \\ 0 & R_2 & 0 \\ 0 & 0 & R_3 \end{bmatrix} \\ \begin{bmatrix} 1 & -1 & 0 \\ 0 & 1 & -1 \end{bmatrix} \end{bmatrix} \begin{Bmatrix} I_1 \\ I_3 \\ I_4 \end{Bmatrix} \quad (8)$$

$$\begin{bmatrix} A_{11} & A_{12} \\ A_{21} & A_{22} \end{bmatrix} \begin{Bmatrix} V_u \\ V_k \end{Bmatrix} = \begin{bmatrix} B_1 \\ B_2 \end{bmatrix} \{I_u\}$$

re-organized to $$A_{11} V_u - B_1 I_u = -A_{12} V_k$$

$$A_{21} V_u - B_2 I_u = -A_{22} V_k \quad (9)$$

or $\begin{bmatrix} A_{11} & -B_1 \\ A_{21} & -B_2 \end{bmatrix} \begin{Bmatrix} V_u \\ I_u \end{Bmatrix} = -\begin{bmatrix} A_{12} \\ A_{22} \end{bmatrix} \{V_k\}$ (10)

with $\begin{Bmatrix} V_u \\ I_u \end{Bmatrix} = -\begin{bmatrix} A_{11} & -B_1 \\ A_{21} & -B_2 \end{bmatrix}^{-1} \begin{bmatrix} A_{12} \\ A_{22} \end{bmatrix} \{V_k\}$ (11)

Equation (11) provides the solution for the unknowns in the grid.

Figure 9:
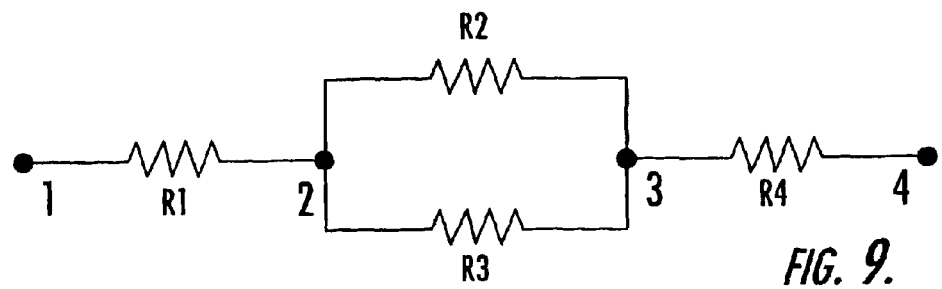
FIG. 9 is an explanatory circuit diagram showing resistors in parallel and in series.

Another example is a circuit with resistors in parallel and in series as shown in FIG. 9.

A set of equations to solve for the unknowns ($I_1$, $I_2$, $I_3$, $I_4$, $V_2$, $V_3$) can be formed as before.

The voltage drop over $R_1$ (over network nodes 1 and 2) is:

$$V_2 - V_1 = I_1 R_1,$$ (12)

the voltage drop over $R_2$ (over network nodes 2 and 3) is:

$$V_3 - V_2 = I_2 R_2,$$ (13)

the voltage drop over $R_3$ (over network nodes 2 and 3) is:

$$V_3 - V_2 = I_3 R_3, \text{ and}$$ (14)

the voltage drop over R4 (over network nodes 2 and 3) is:

$$V_4 - V_3 = I_4 R_4.$$ (15)

At the nodes, the net current flow must be zero. Thus, at node 2

$$I_1 - I_2 - I_3 = 0, \text{ and}$$ (16)

at node 3

$$I_2 + I_3 - I_4 = 0.$$ (17)

In matrix form:

$$\begin{bmatrix} -1 & 1 & 0 & 0 \\ 0 & -1 & 1 & 0 \\ 0 & -1 & 1 & 0 \\ 0 & 0 & -1 & 1 \\ 0 & 0 & 0 & 0 \\ 0 & 0 & 0 & 0 \end{bmatrix} \begin{Bmatrix} V_1 \\ V_2 \\ V_3 \\ V_4 \end{Bmatrix} = \begin{bmatrix} R_1 & 0 & 0 & 0 \\ 0 & R_2 & 0 & 0 \\ 0 & 0 & R_3 & 0 \\ 0 & 0 & 0 & R_4 \\ 1 & -1 & -1 & 0 \\ 0 & 1 & 1 & -1 \end{bmatrix} \begin{Bmatrix} i_1 \\ i_2 \\ i_3 \\ i_4 \end{Bmatrix}$$ (18)

This matrix can be re-organized and solved following the steps shown in Equations (8) through (11).

Thus, one innovation of this invention is a method for determining the leg resistances of a grid network of resistances. The internal currents and voltages can be determined by applying known voltages to the external nodes of the network if the leg resistances are known using an iterative algorithm that converges to the leg resistances, without any prior knowledge of the resistances.

The network of FIG. 3 will be used as an example to describe the preferred method. In this 12 leg resistive network, nodes 1–4 and 6–9 are boundary nodes. All of the leg resistances are determined by only measuring the resistances between the boundary nodes. The algorithm preferably places these resistances in a column vector $\{R_{Meas}\}$ thus:

$$\{R_{Meas}\} = \begin{bmatrix} R_{12} & R_{13} & R_{14} & R_{16} & R_{17} & R_{18} & R_{19} \\ & R_{23} & R_{24} & R_{26} & R_{27} & R_{28} & R_{29} \\ & & R_{34} & R_{36} & R_{37} & R_{38} & R_{39} \\ & & & R_{46} & R_{47} & R_{48} & R_{49} \\ & & & & R_{67} & R_{68} & R_{69} \\ & & & & & R_{78} & R_{79} \\ & & & & & & R_{89} \end{bmatrix}$$ (19)

Note that $R_{ij}$ is the measured resistance or impedance between boundary nodes i and j.

The first step in the iterative algorithm is to calculate what the resistances between the boundary nodes will be for initial estimates of the leg resistances ($R_{Estimate}^k$). Here k is the index of the iterative loop. The closer the initial estimates are to the actual leg resistances, the quicker the algorithm will converge. Intelligent methods for determining good initial estimates are discussed later.

The calculated resistances are obtained by using the method outlined in the previous section. Once the input currents are known, the resistances between boundary nodes can be calculated and stored in a column vector $\{R_{Estimate}^k\}$.

The second step in the iterative algorithm is to determine how this column of resistances will change when a leg resistance is perturbed. Let $\{R_n^k\}$ be the column vector between nominal and when leg number n's resistance has been changed by a small delta from the initial estimate, that is let:

$$\{R_n^k\} = \left\{ R \begin{pmatrix} R_1^k \\ M \\ R_n^k(1+\delta) \\ M \end{pmatrix} \right\} - \{R_{Estimate}^k\}$$ (20)

A matrix $[R_{Perturbed}^k]$ is constructed of these column vectors where the columns are obtained by varying sequentially the leg resistances.

$$[R_{Perturbed}^k] = [\{R_1^k\}\{R_2^k\}L\{R_{Nelem}^k\}]$$ (21)

where Nelem is the number of legs (resistive elements) in the grid. An improved estimate of the leg resistances are obtained using the following equation:

$$R_{Estimate}^{k+1} = R_{Estimate}^k + F_{Relax} \delta R_{Estimate}^k \cdot$$ (22)

$$[[R_{Perturbed}^k]^T [R_{Perturbed}^k]]^{-1} [R_{Perturbed}^k]^T [R_{Estimate}^k - R_{Meas}]$$

Where $F_{Relax}$ is a relaxation factor determined by standard relaxation methods.

The algorithm can also be used to identify failures in electronic circuits. Since the algorithm will sense the impedance of grid elements, the algorithm can detect when a leg is short circuited, the resistance is zero, or near-zero. The algorithm can also detect if a connection has been broken. For broken connections, the leg impedance goes to infinity, which can be detected by the algorithm.

The algorithm can also be used to identify complex impedances in a network. For example, by using complex variables, the approach can be used to identify complex impedances of the form:

$$Z = Z_R + jZ_1$$ (23)

where $j = \sqrt{-1}$, $Z_R$ is the real component and $Z_1$ is the imaginary component of the impedance. In this process, an impedance meter will measure the complex impedance across the external nodes and the same procedure outlined in equations (19) through (22) will yield a measure of the grid impedances.

Figure 10:
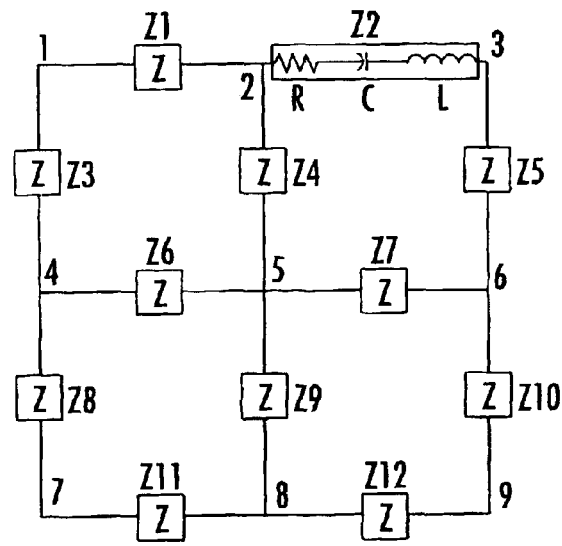
FIG. 10 is a circuit diagram showing a grid with complex impedances.

By measuring the impedance of the network at different frequencies, the method can be used to identify capacitances and inductors in an electrical network. Thus each leg can have a combination of a pure resistance, a pure capacitor and/or a pure inductor as shown in FIG. 10. When a leg impedance is measured at three different frequencies $\omega_1$, $\omega_2$, and $\omega_3$, three equations can be written for the unknowns in the leg impedance (R, C and L):

$$j\omega_1 L + R - j\frac{C}{\omega_1} = Z_1 = Z(\omega_1) \quad (24)$$

$$j\omega_2 L + R - j\frac{C}{\omega_2} = Z_2 = Z(\omega_2)$$

$$j\omega_3 L + R - j\frac{C}{\omega_3} = Z_3 = Z(\omega_3)$$

where $Z_1$, $Z_2$, and $Z_3$ are the leg impedances obtained at the three different frequencies. From these three equations the equivalent resistance, capacitance and inductance of any leg can be uniquely determined. When more test frequencies are used, minimization techniques can be used to estimate the values of leg elements.

The method or algorithm can use all the nodes in the grid or only the boundary nodes. The question is if all the leg impedances can be determined if resistances are only measured between the boundary nodes.

For a regular grid of N×M nodes, the number of boundary nodes is $$2M+2N-4, \text{ and} \quad (25)$$

the number of elements in a regular grid (See FIGS. 3 and 10) is $$M(N-1)+N(M-1)=2MN-M-N, \quad (26)$$

and the number of leg impedances that can be determined is equal to the number of unique measurements that can be made between the external nodes is:

$$[2N+2M-4][2N+2M-4-1]/2=2N^2+2M^2+4NM-9N-9M+10 \quad (27)$$

Since $$(2N^2+2M^2+4NM-9N-9M+10)-(2MN-M-N)=2(N^2+M^2+MN)-8(N+M)+10>0, \quad (28)$$

the conclusion is that additional elements can be added to the regular grid.

A good choice for an initial guess is the mean of the measured resistances between the boundary nodes, that is:

$$R_n^{k=1}=\text{mean}\{R_{Meas}\} \text{ for } n=1, \text{Nelem} \quad (29)$$

This choice leads to convergence without any relaxation in most cases studied.

Figure 11:
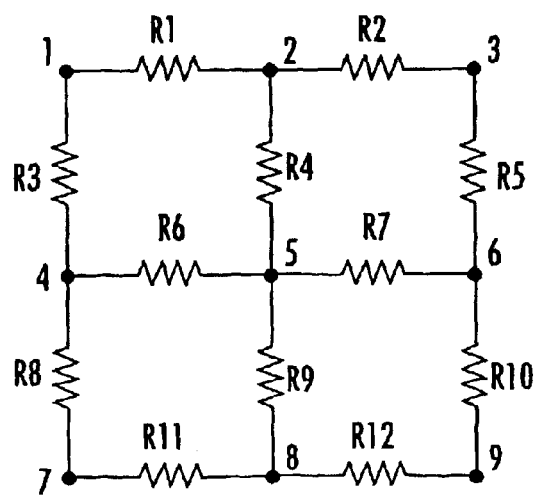
FIG. 11 is a circuit diagram showing a twelve node resistive grid.
Figure 12:
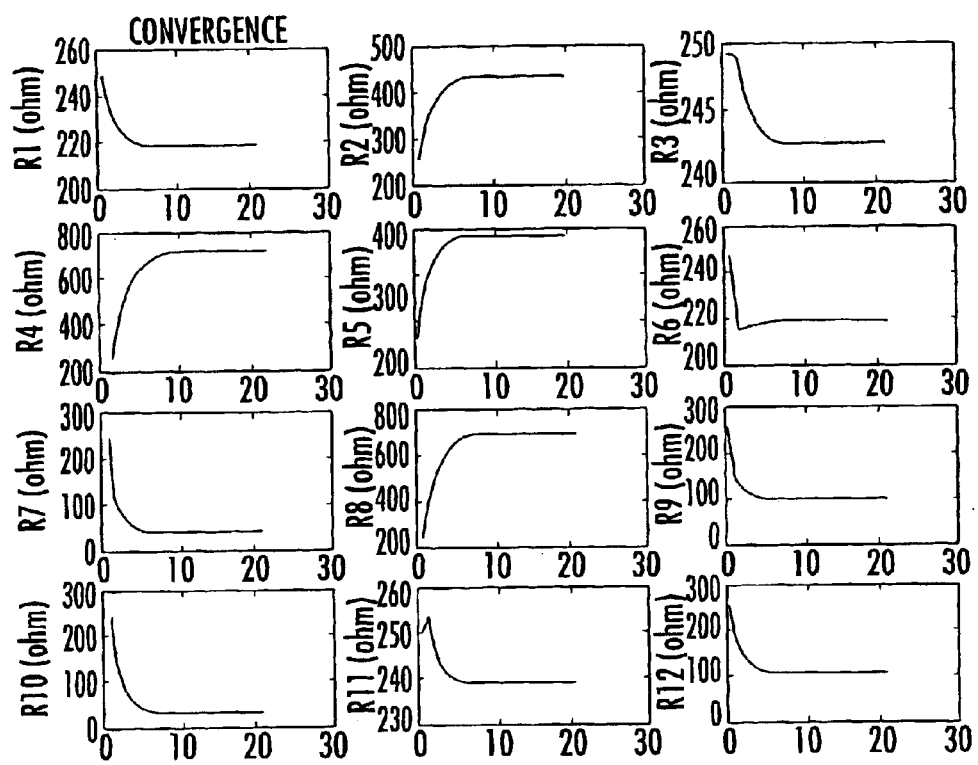
FIG. 12 is a view of several graphs showing the number of iterations required of the algorithm of this invention in order to obtain convergence when a relaxation technique is employed.
Figure 13:
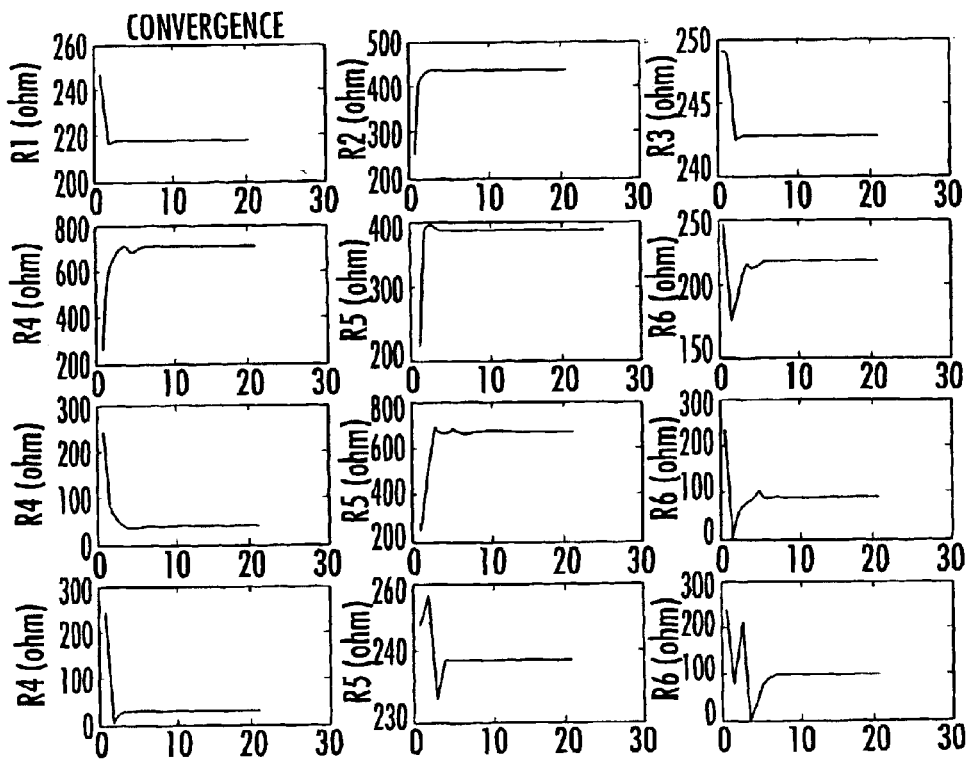
FIG. 13 is a view similar to FIG. 12 except no relaxation technique is employed.

The grid of FIG. 11 was constructed using carbon resistors. Resistance measurements between the boundary nodes (see equation (19)) are reported in Table I. The algorithm was coded in Matlab, and converged rapidly to the actual leg resistances (Table II). Convergences of two cases are shown in FIGS. 12 and 13. FIG. 12 shows how the algorithm converges when relaxation is used and FIG. 13 shows the convergence when no relaxation is used in the algorithm. Note that although not shown, convergence is achieved within one or two steps when the initial guesses of the leg resistances are near the actual values.

TABLE I

Measured Resistances between Boundary Nodes.

| In | Out | 2 | 3 | 4 | 6 | 7 | 8 | 9 |
|---|---|---|---|---|---|---|---|---|
| 1 | | 172 | 361 | 185 | 264 | 402 | 287 | 281 |
| 2 | | | 273 | 253 | 251 | 414 | 281 | 270 |
| 3 | | | | 349 | 261 | 459 | 307 | 284 |
| 4 | | | | | 169 | 278 | 184 | 184 |
| 6 | | | | | | 231 | 61 | 26 |
| 7 | | | | | | | 189 | 233 |
| 8 | | | | | | | | 59 |
| 9 | | | | | | | | |

TABLE II

The resistances as determined by the Iterative Algorithm.

| Resistance (Ω) | Resistance from Algorithm (Ω) |
|---|---|
| 219 | 219 |
| 428 | 428 |
| 243 | 243 |
| 699 | 700 |
| 388 | 389 |
| 219 | 219 |
| 36 | 35 |
| 682 | 683 |
| 91 | 91 |
| 30 | 30 |
| 239 | 238 |
| 99 | 98 |

Figure 14:
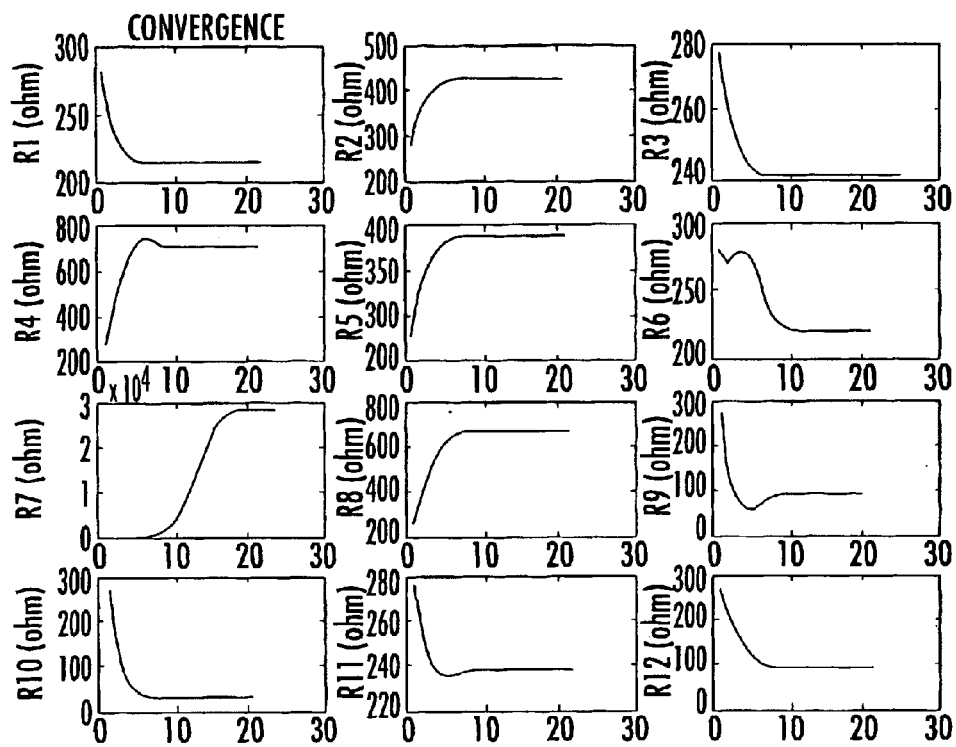
FIG. 14 is another set of graphs showing convergence in accordance with the subject invention with the relaxation technique when a resistive element is removed.
Figure 15:
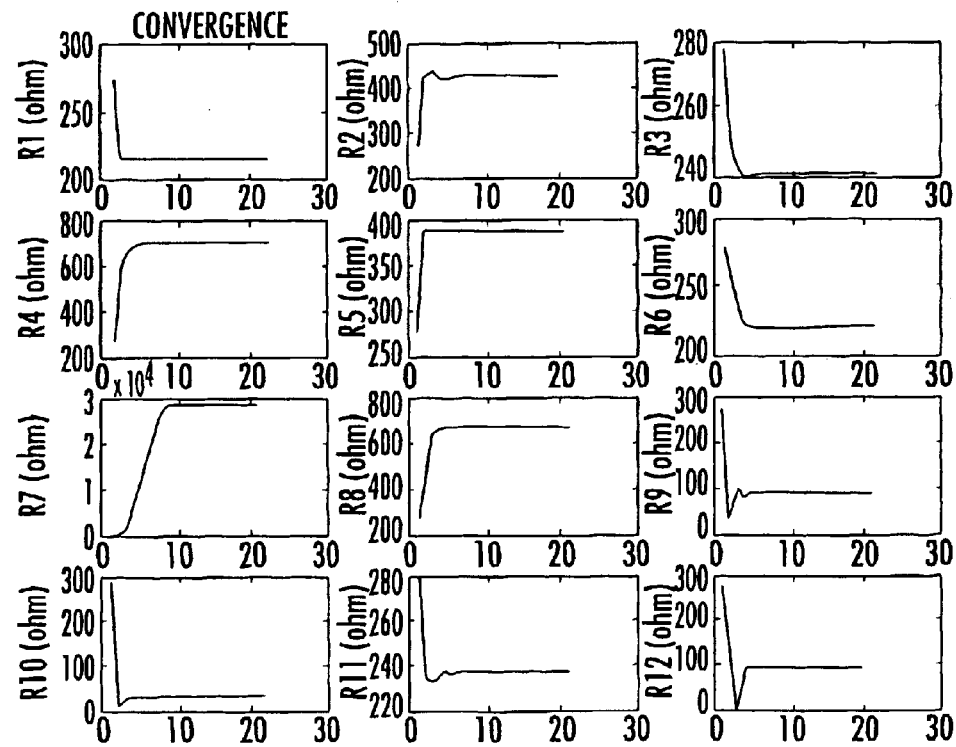
FIG. 15 is a view similar to FIG. 14 except that the relaxation technique is not employed.

In another experiment, resistance $R_7$ was removed in the grid of FIG. 11 to show that the method can be used to determine failure of components. Resistance measurements between the boundary nodes (see equation (19)) are reported in Table III. The algorithm again converged rapidly to the actual leg resistances (Table IV). Convergences of two cases are shown in FIGS. 14 and 15. FIG. 14 shows how the algorithm converges when relaxation is used and FIG. 15 shows the convergence when no relaxation is used in the algorithm.

All unknown resistances with one removed

TABLE III

Measured Resistances between Boundary Nodes.

| In | Out | 2 | 3 | 4 | 6 | 7 | 8 | 9 |
|---|---|---|---|---|---|---|---|---|
| 1 | | 172 | 389 | 186 | 351 | 402 | 291 | 339 |
| 2 | | | 292 | 257 | 322 | 415 | 282 | 315 |
| 3 | | | | 391 | 277 | 476 | 319 | 289 |
| 4 | | | | | 280 | 283 | 193 | 263 |
| 6 | | | | | | 299 | 116 | 30 |
| 7 | | | | | | | 190 | 276 |
| 8 | | | | | | | | 92 |
| 9 | | | | | | | | |

TABLE IV

The resistances as determined by the Iterative Algorithm for the case where Resistor 7 is removed (Open Circuit between Nodes 5 and 6).

| Resistance (Ω) | Resistance from Algorithm (Ω) |
|---|---|
| 219 | 216 |
| 428 | 426 |
| 243 | 241 |
| 699 | 709 |
| 388 | 389 |
| 219 | 219 |
| Open | Open |
| 682 | 677 |
| 91 | 91 |
| 30 | 30 |
| 239 | 239 |
| 99 | 99 |

A mathematical model was also constructed of the circuit shown in FIG. 10. The leg impedances were randomly selected as shown in Table V below:

TABLE V

R1 = (62.6 + 13.1j) Ω
R2 = (103.2 + 61.8j) Ω
R3 = (14.3 + −128.0j) Ω
R4 = (217.4 + −52.9j) Ω
R5 = (128.2 + 124.7j) Ω
R6 = (93.2 + 79.6j) Ω
R7 = (113.4 + −17.1j) Ω
R8 = (73.5 + 29.8j) Ω
R9 = (95.2 + 129.5j) Ω
R10 = (49.7 + −194.0j) Ω
R11 = (127.6 + 45.3j) Ω
R12 = (167.3 + −197.9j) Ω

Figure 16:
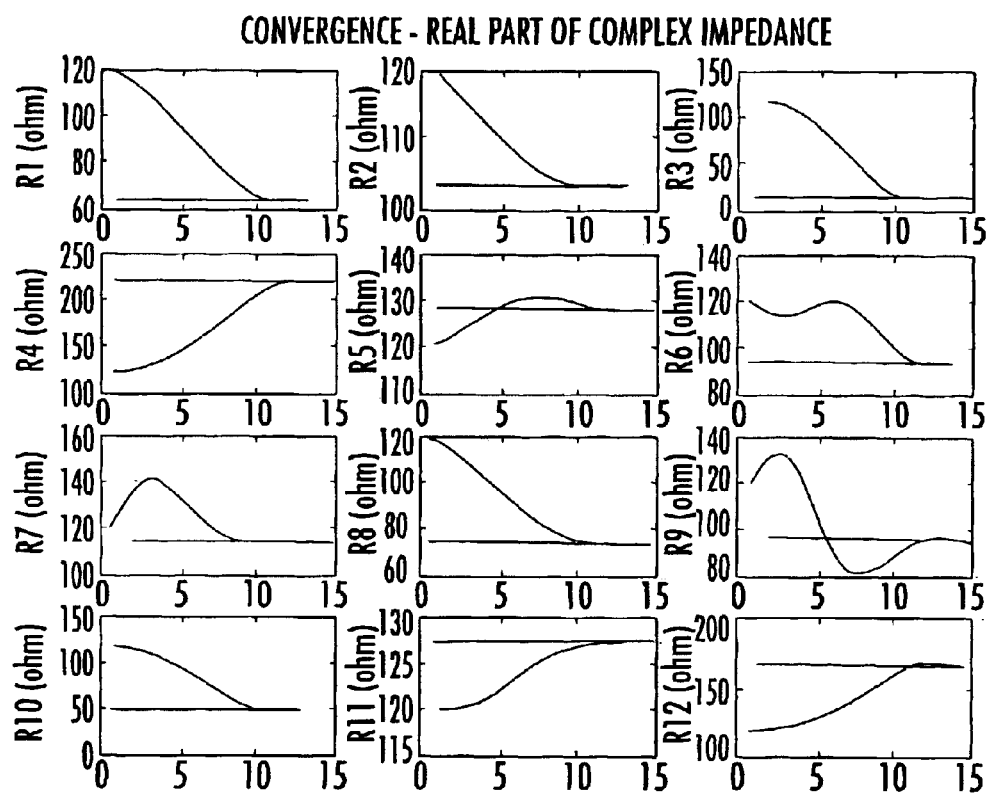
FIG. 16 is a set of graphs showing convergence for the real parts of the complex impedance grid shown in FIG. 10.
Figure 17:
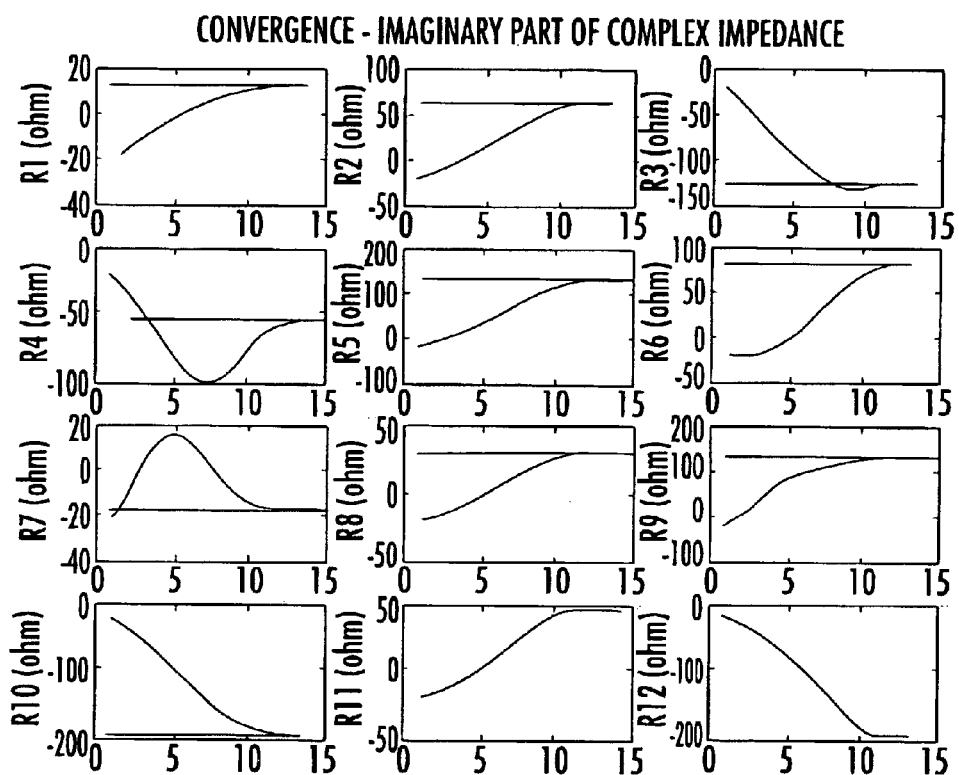
FIG. 17 is a set of graphs showing convergence of the imaginary parts of the complex impedance grid of FIG. 10.

The convergence of the algorithm, starting with the mean of the simulated measurements between the boundary nodes are shown in FIGS. 16 and 17. FIG. 16 is the convergence of the real parts and FIG. 17 the convergence of the imaginary parts of the leg impedances. Note that although not shown, convergence is achieved within one or two steps when the initial guesses of the leg impedances are near the actual values.

Figure 18:
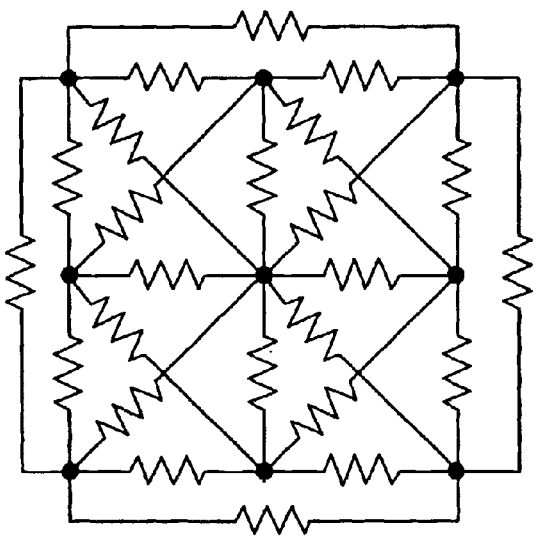
FIG. 18 is a view of another resistive network which can be analyzed in accordance with the subject invention.
Figure 19:
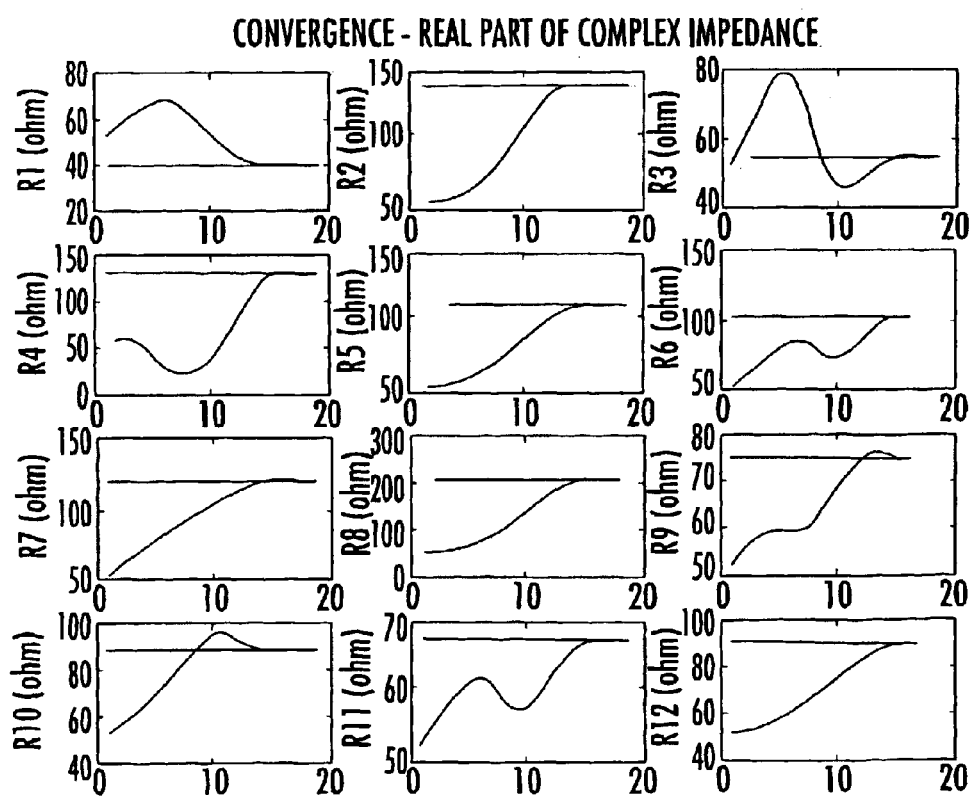
FIG. 19 is a set of graphs showing convergence of the real parts of the grid shown in FIG. 18.
Figure 20:
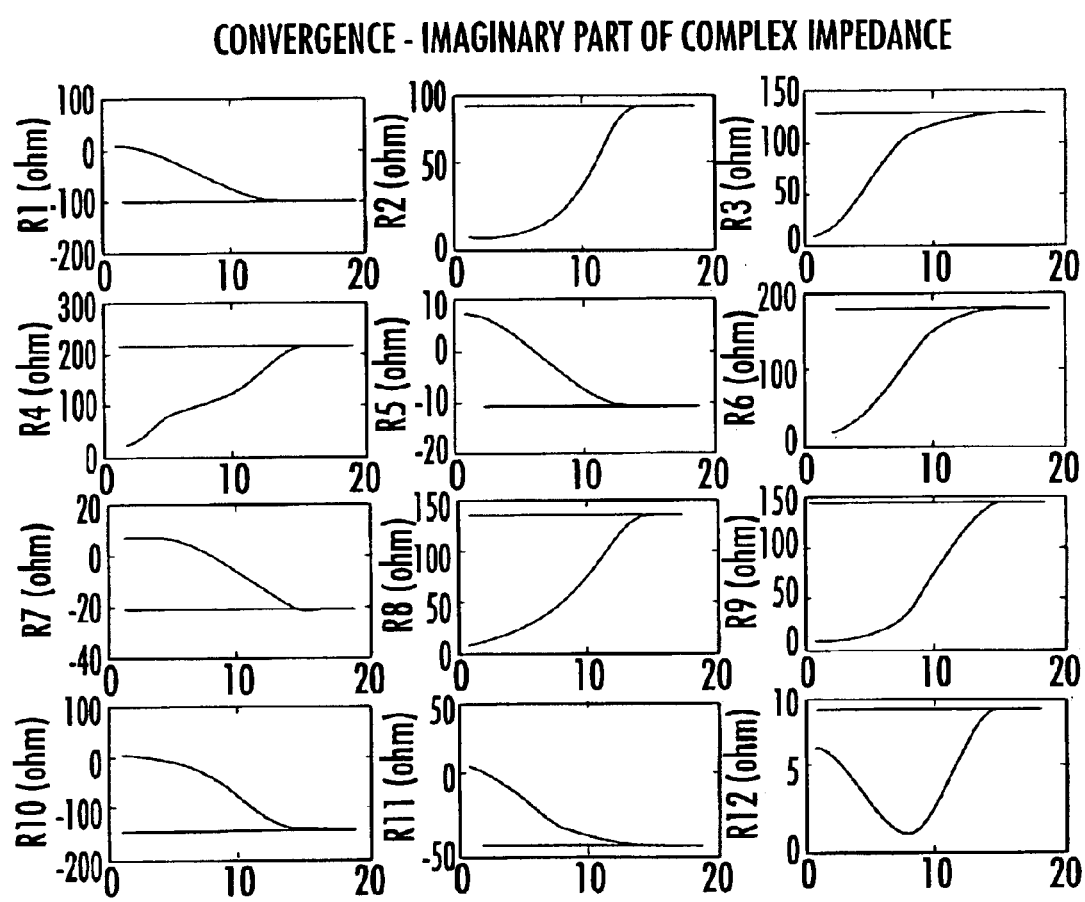
FIG. 20 is a set of graphs showing the convergence of the imaginary parts of the grid of FIG. 18.

In another example, a mathematical model was constructed of the circuit shown in FIG. 18. FIGS. 19 and 20 show that the algorithm converges to the correct impedances.

Figure 21:
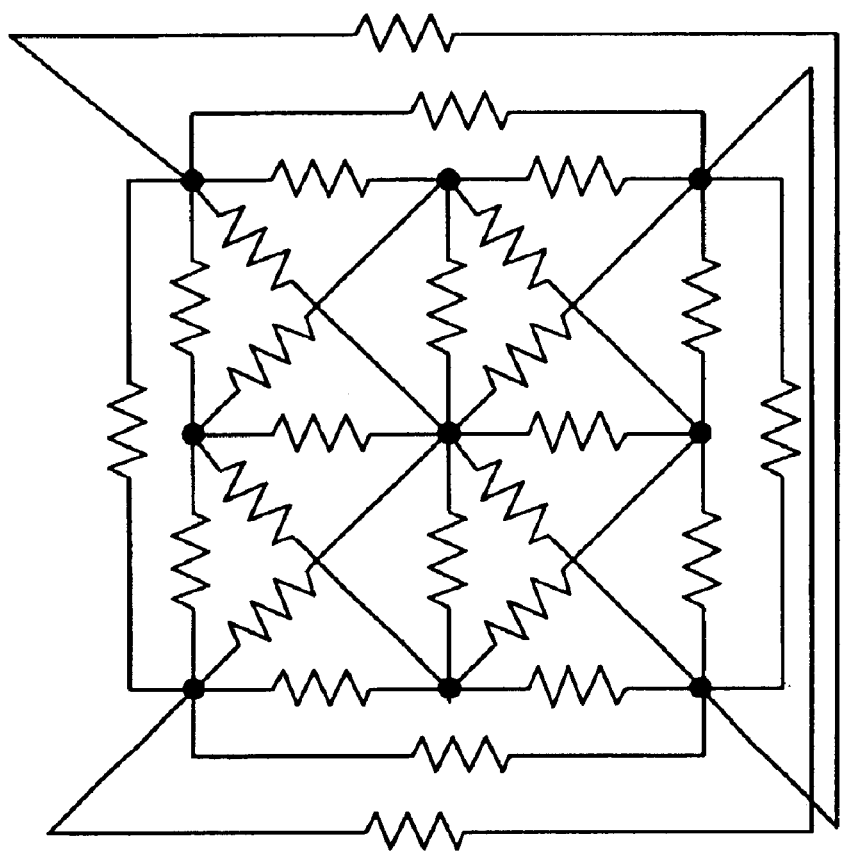
FIG. 21 is a view of still another grid which can be analyzed in accordance with the subject invention.
Figure 22:
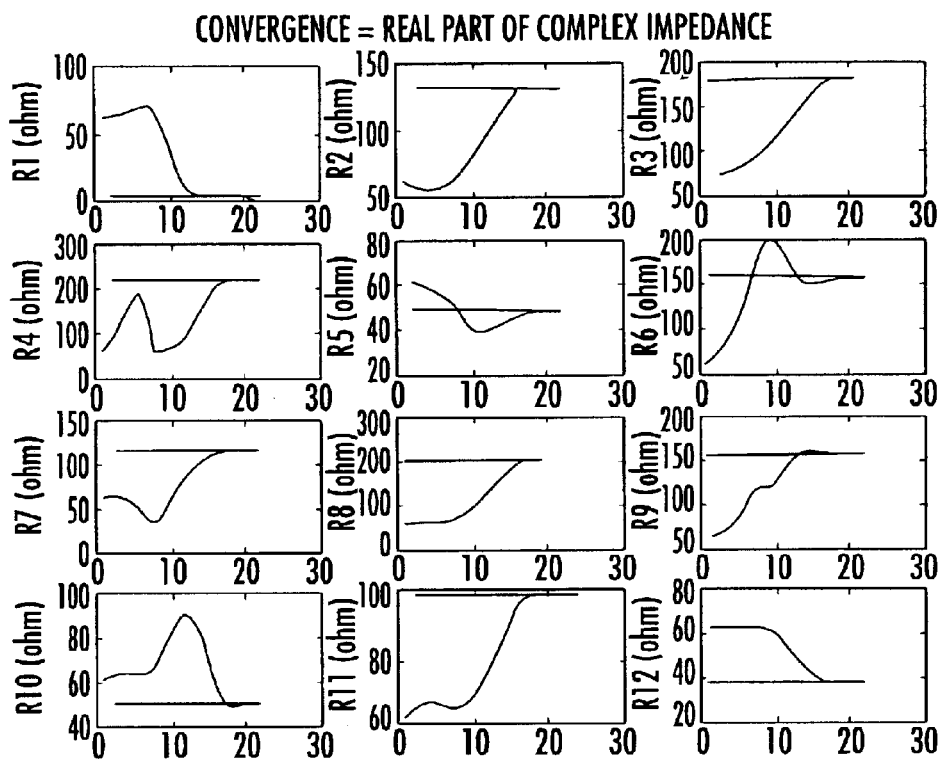
FIG. 22 is a set of graphs showing convergence of the real parts of the grid of FIG. 21.
Figure 23:
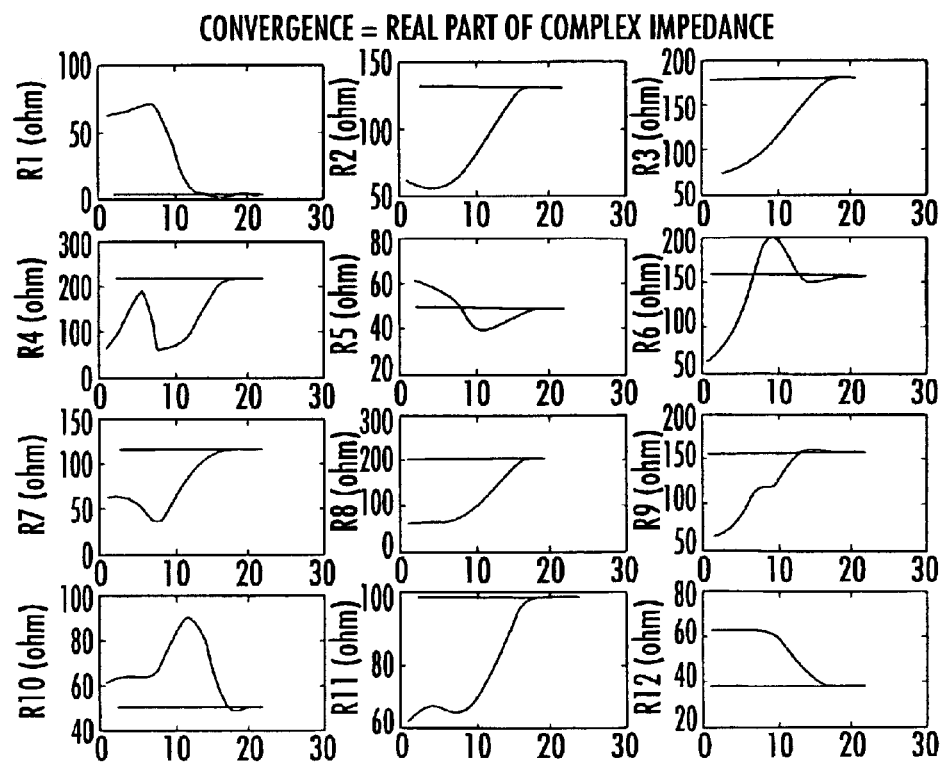
FIG. 23 is a set of graphs showing convergence of the imaginary parts of the grid of FIG. 21.

In another example, a mathematical model was constructed of the circuit shown in FIG. 21. FIGS. 22 and 23 show that the algorithm converges to the correct impedances.

Figure 24:
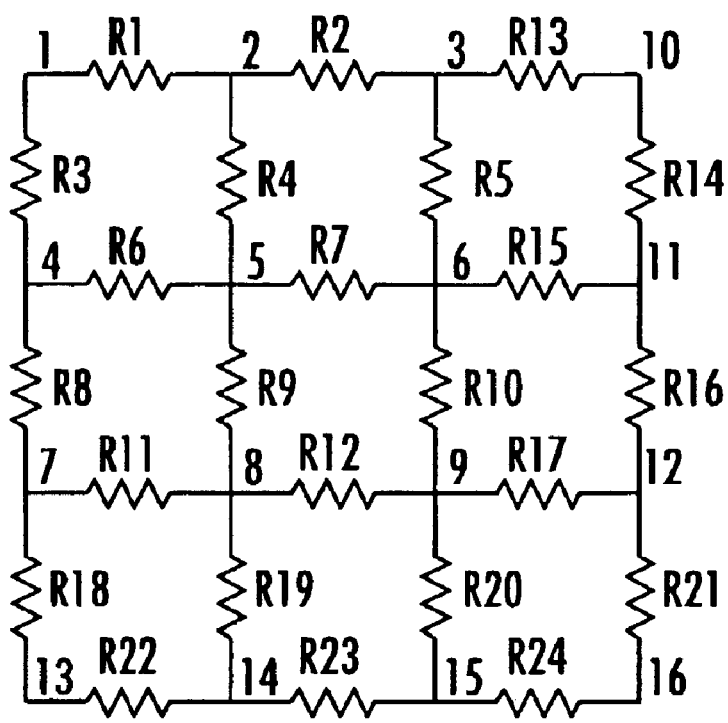
FIG. 24 is a view of another grid which can be fully analyzed in accordance with the subject invention.

Another mathematical model was constructed of the 16 node circuit shown in FIG. 24. The leg impedances were randomly selected as:

TABLE VI

R1 = (1.3 + 199.9j) Ω
R2 = (126.4 + −162.3j) Ω
R3 = (163.7 + −190.0j) Ω
R4 = (177.5 + −164.9j) Ω
R5 = (140.3 + −146.9j) Ω
R6 = (55.3 + 181.0j) Ω
R7 = (31.8 + −160.0j) Ω
R8 = (143.3 + 51.5j) Ω
R9 = (208.1 + −101.6j) Ω
R10 = (179.5 + −122.9j) Ω

TABLE VI-continued

R11 = (204.7 + 93.7j) Ω
R12 = (68.2 + 21.6j) Ω
R13 = (59.1 + 194.2j) Ω
R14 = (118.0 + −74.9j) Ω
R15 = (35.9 + 90.0j) Ω
R16 = (46.4 + 195.1j) Ω
R17 = (47.7 + 35.9j) Ω
R18 = (143.4 + 167.3j) Ω
R19 = (11.6 + 109.8j) Ω
R20 = (50.4 + −53.0j) Ω
R21 = (146.8 + 99.2j) Ω
R22 = (68.4 + −148.4j) Ω
R23 = (67.5 + 200.7j) Ω
R24 = (158.5 + −133.7j) Ω

Figure 25:
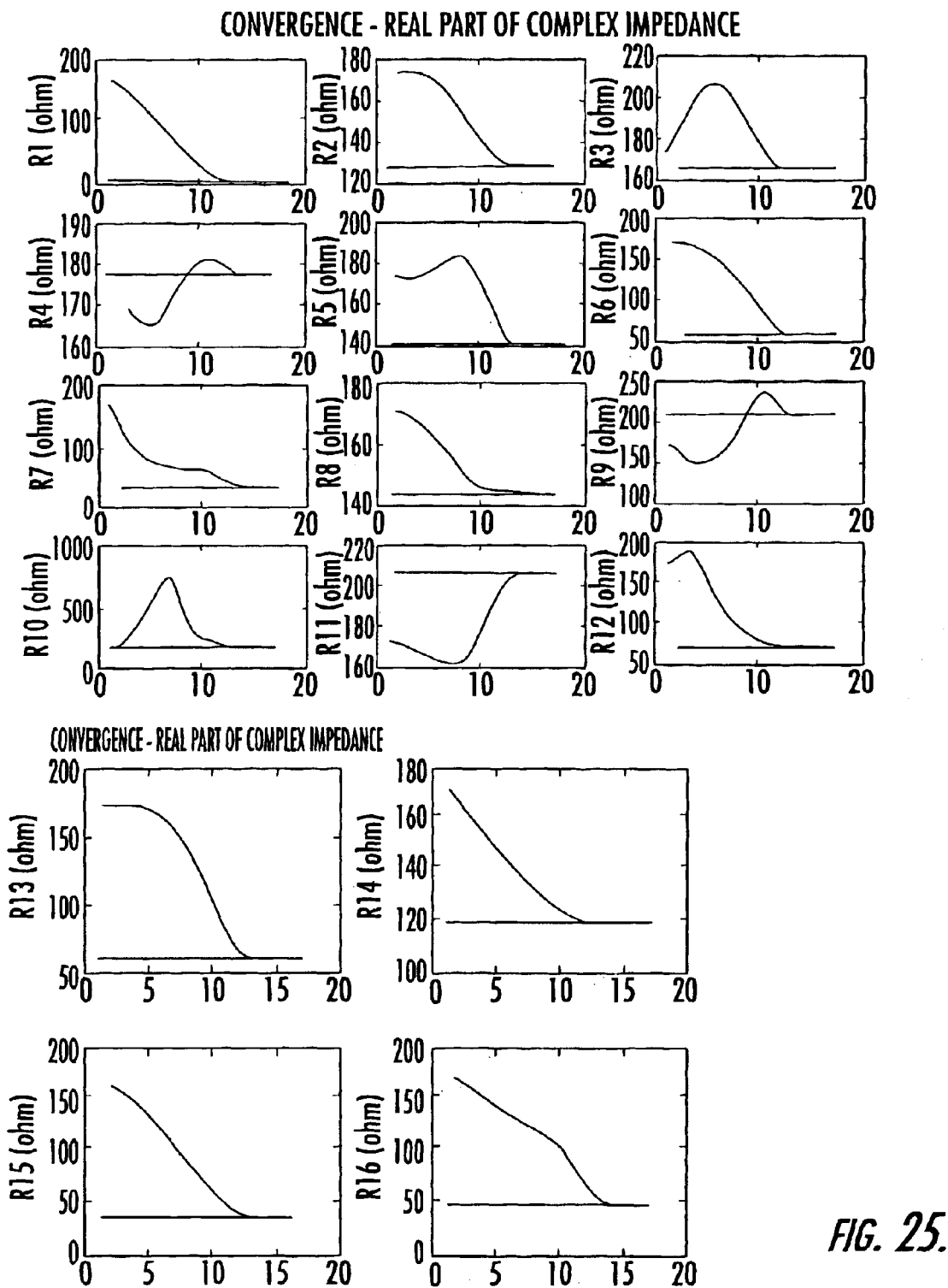
FIG. 25 is a set of graphs showing convergence of the real parts of the complex impedance shown in FIG. 24.
Figure 26:
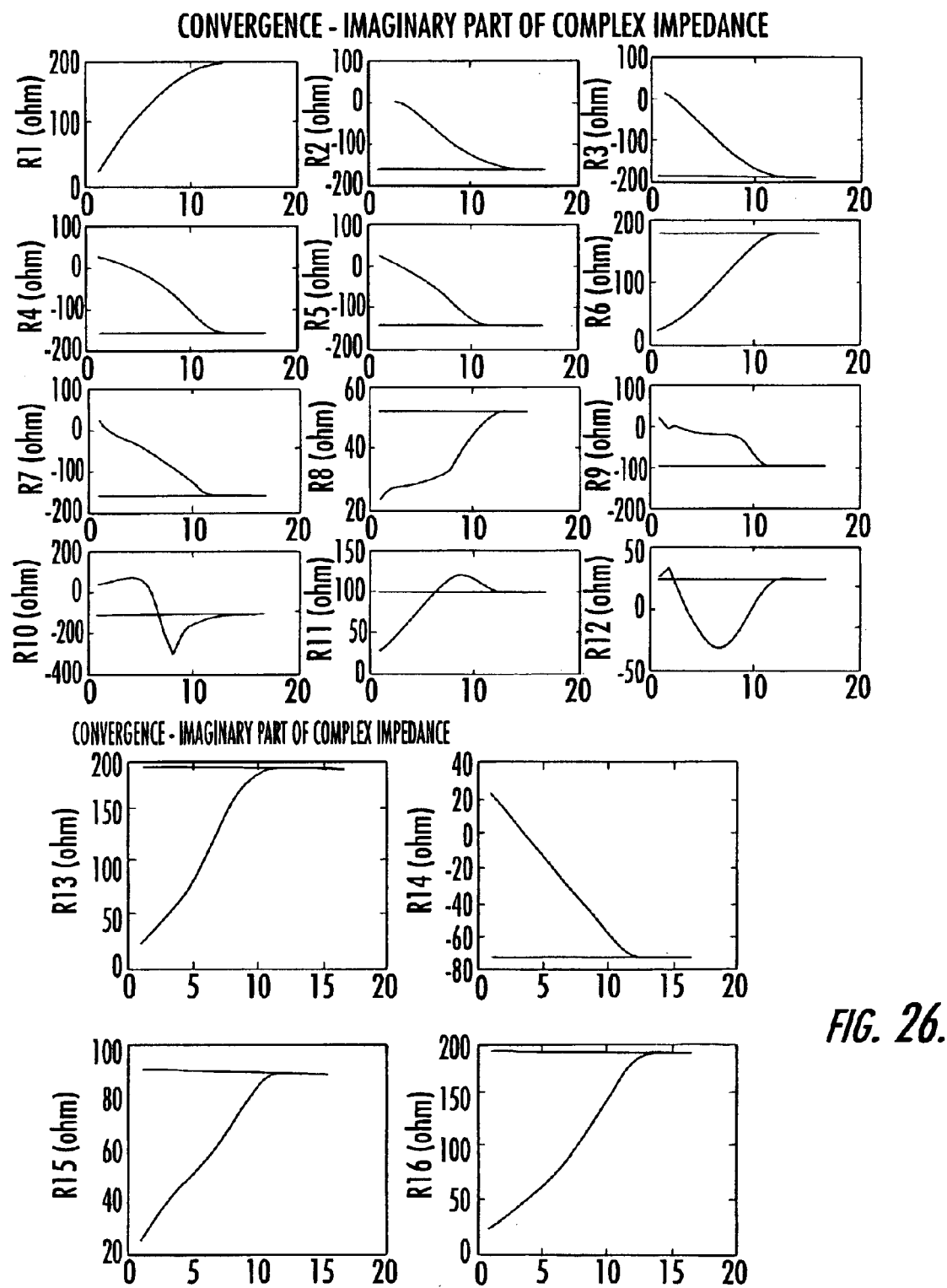
FIG. 26 is a set of graphs showing convergence of the imaginary parts of the complex impedances of the grid of FIG. 24.

The convergence of the algorithm, starting with the mean of the simulated measurements between the boundary nodes are shown in FIGS. 25 and 26. FIG. 25 shows the convergence of the real parts and FIG. 26 shows the convergence of the imaginary parts of the leg impedances. Note that although not shown, convergence is achieved within one or two steps when the initial guesses of the leg impedances are near the actual values.

In addition, although leg resistances and impedances are the typical characteristics analyzed by the method of this invention, analysis of other characteristics is possible.

Examples of Sensor Technologies

Strains induced in a structure are often complex and, depending on the loads, the strains can vary significantly spatially. This invention provides a grid of resistive elements that are sensitive to changes in strain. For example, constructing a grid of copper wires, where the resistance of the copper wires changes when they are strained, can form such a grid. An alternative strain sensitive material is pseudoelastic shape memory alloy wires. Using the methods described above, the resistance of each leg in the sensor grid is determined and the sensor grid can be used to measure, in detail, the complex strain in a structure. The sensors can be large to measure global structural strains or small to obtain a detail measurement of a stress concentration.

The sensing grids can also be used to determine spatial variation of loads and to determine the point of application of a load, for example, where a finger or stylus presses down on an input device constructed using the strain sensitive grid.

In one aspect of this invention is a grid of strain sensitive elements are used and the algorithm determines the resistance in each leg of the grid while only having electrical access to the external or boundary nodes of the grid.

The effective algorithms described above are used to determine the resistances in a sensor-grid make strain-sensing grids attractive for many applications. The grid elements in the sensing grid are connected at the internal nodes. FIG. 11 serves as an example. In this resistive grid, the algorithm only requires the resistances between the boundary nodes to be measured. For example: R1-2 (the resistance between Node 1 and 2), R1-3, R1-4, R1-6, R1-7, R1-8, R1-9, R2-3, R2-3, etc.

The algorithm converged to the actual resistance values within 8 iterations. It should be noted that algorithm converges much faster (one or two iterations) when the initial guess for the grid resistances are near the actual values. In this example the initial guess was randomly set to be between 0 and 500 Ω. Given that in strain sensors the resistance change is proportional to strain, the conclusion is that the algorithm can thus measure the change in strain anywhere in the sensor-grid.

And, when Resistor 7 was removed, simulating a destructive failure at this location, the algorithm, using only measurements made through electrically accessing the boundary nodes (1, 2, 3, 4, 6, 7, 8 and 9), rapidly converges to the correct resistances. By verifying that the algorithm can detect a broken connection, it is demonstrated that the proposed solution is not only robust, but it can also be used for structural health monitoring.

Figure 27:
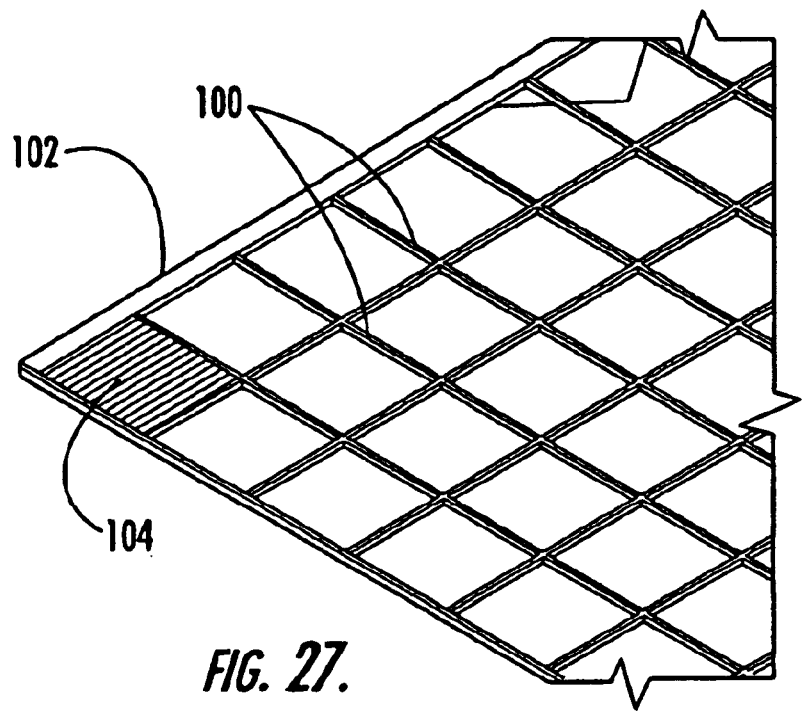
FIG. 27 is a schematic view of a portion of a complete sheet-like sensor in accordance with the subject invention.

The preferred sensor grid of FIG. 27 is encapsulated in an appropriate encapsulation material. Kapton is one choice, but other materials that are used in standard foil and ceramic strain gauges can also be used. Encapsulation provides a robust solution that will allow the sensor to be easily bonded to structural surfaces or to be integrated as a composite layer.

Structural strain will be inferred from the measurement of the change in grid-leg resistances. The "leg" resistances are determined by the algorithm disclosed above that only requires access to the boundary nodes of the grid.

The use of a strain-sensing grid of strain-sensitive thin shape memory alloy wires 100 connected on their boundary ends to bus 102 allow the sensor-grid to measure large strains. Depending on the fineness of the grid, strain can be monitored in far more detail than possible with point sensors. Ultra-thin copper, pseudoelastic shape memory alloy wires, and standard foil or ceramic gauges can be used as the sensor elements (legs).

The low-weight, robust and thin encapsulated sensor grid can be bonded to any structural surface, or it can be integrated into the structure itself as one of the layers in the composite. Logic can be added to the sensor-grid to determine structural health, structural shape, strain detail at stress concentrations, and structural dynamic response by the use of circuitry disposed on flex circuit 104. The sensor grids can also be used to improve the accuracy and sensitivity of loadcells, pressure sensors and accelerometers.

Figure 28:
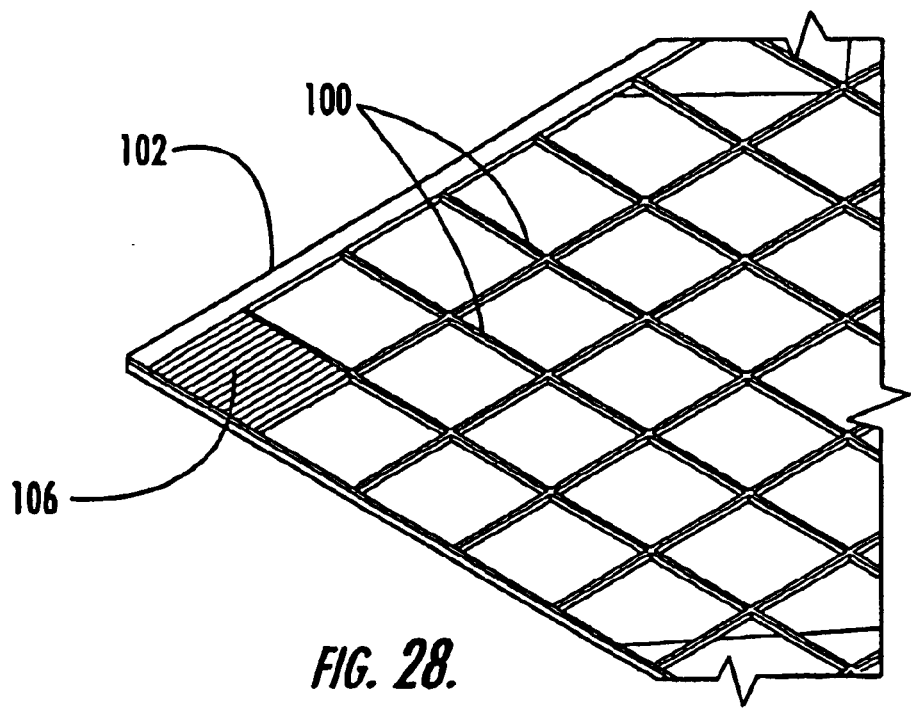
FIG. 28 is a schematic view of a portion of still another sheet-like sensor in accordance with the subject invention employing a piezoelectric actuator.

When piezoelectric actuator 106, FIG. 28 is added to the sensor-grid, the sensor-grid can also be used to sense structural vibration for active vibration and noise control and structural health monitoring. Using a piezoelectric actuator to create vibrations in the structure, the sensor-grid can be used to detect the structural response.

Figure 29:
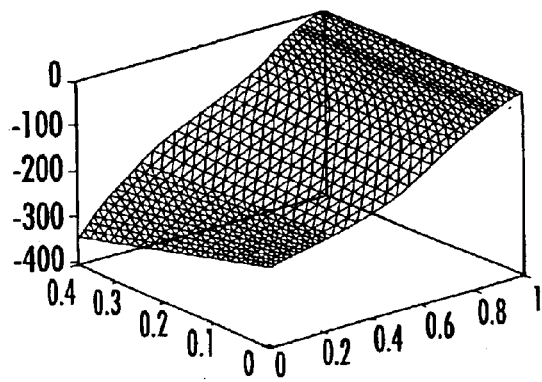
FIGS. 29–31 are three dimensional graphs showing various surface strain shapes.
Figure 30:
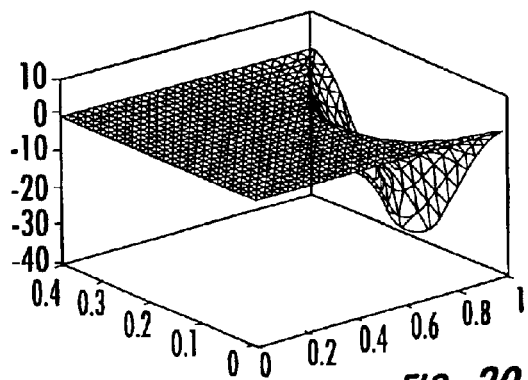
Figure 31:
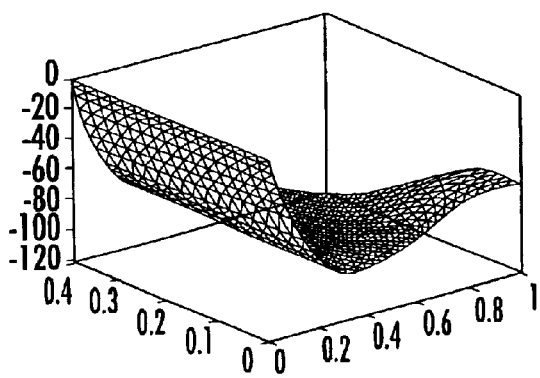

The proposed technology is markedly different from the "point-sensor" approach and warrants some basic understanding of the problem. In order to make the case that the proposed technology is feasible, a simple Rayleigh-Ritz model of a 1 m span, 0.4 m chord and 20 mm thick cantilevered plate was constructed. This Rayleigh-Ritz model was used to predict the static deflection of the plate when subjected to out-board leading and trailing edge vertical loads. The vertical loads were sized to yield a maximum deflection equal to one percent (1%) of the span dimension, namely 10 mm. FIGS. 29–31 show the surface strains predicted by this model for these loads. The surface strains are measured by strain gauges attached to the upper or lower surface of the plate are approximately 340 microStrain for this moderate deflection. State-of-the-art data acquisition systems can reliably measure strains in the 10–20 microStrain range.

Embedding the sensor-grid in a soft polymer also allows the subject invention to be used as a fluid flow shear sensor. When the sensor is attached to the surface of an underwater vehicle, it can measure shear stresses induced by fluid flow.

Figure 32:
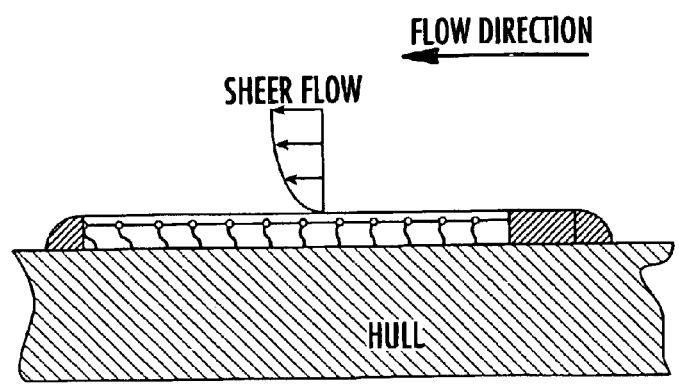
FIG. 32 is a schematic view showing an embodiment of the subject invention wherein the sheet-like sensor is employed as a shear stress sensor on the hull of a ship.
Figure 33:
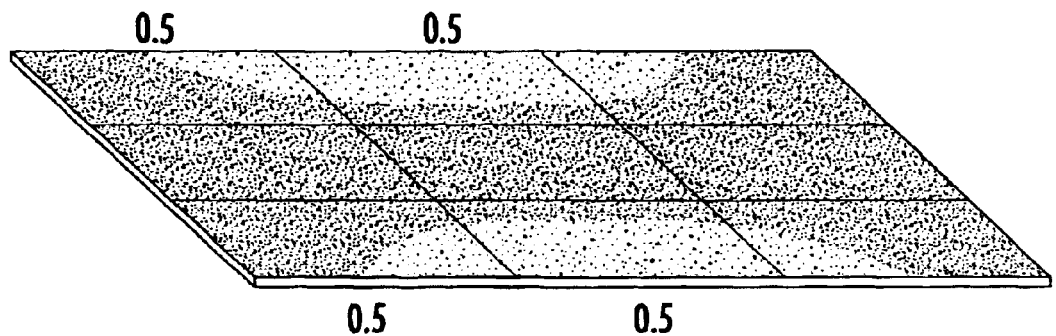
FIG. 33 is a depiction of the deformation of the sensor of FIG. 32 under shear stress.

A shear-sensor design is shown in FIG. 32. In this design both ends of the sensor are fixed. The strain-sensitive wires will be pre-stressed between the two "fixed" boundaries while the sides will be unconstrained. The strain-sensitive wires will be pre-stressed to accommodate the compressive stresses that will be seen by the wire. The finite element model of FIG. 33 predicts a sensitivity of 0.1 microStrain/Pa.

Figure 34:
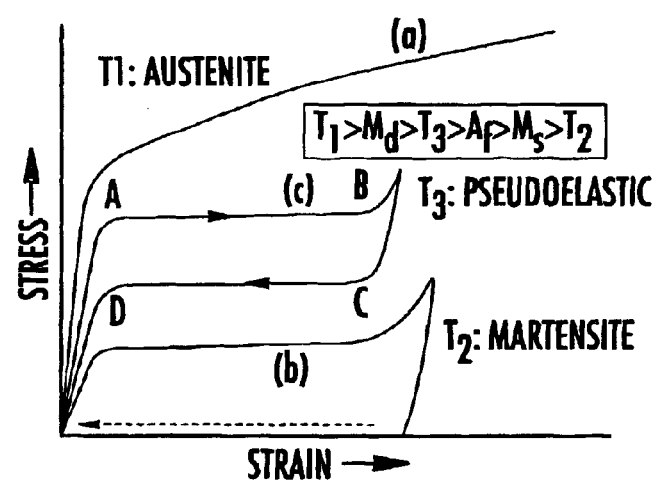
FIG. 34 is a stress-strain curve at different temperatures relative to transformation for various materials useful as the grid members in accordance with the subject invention.
Figure 35:
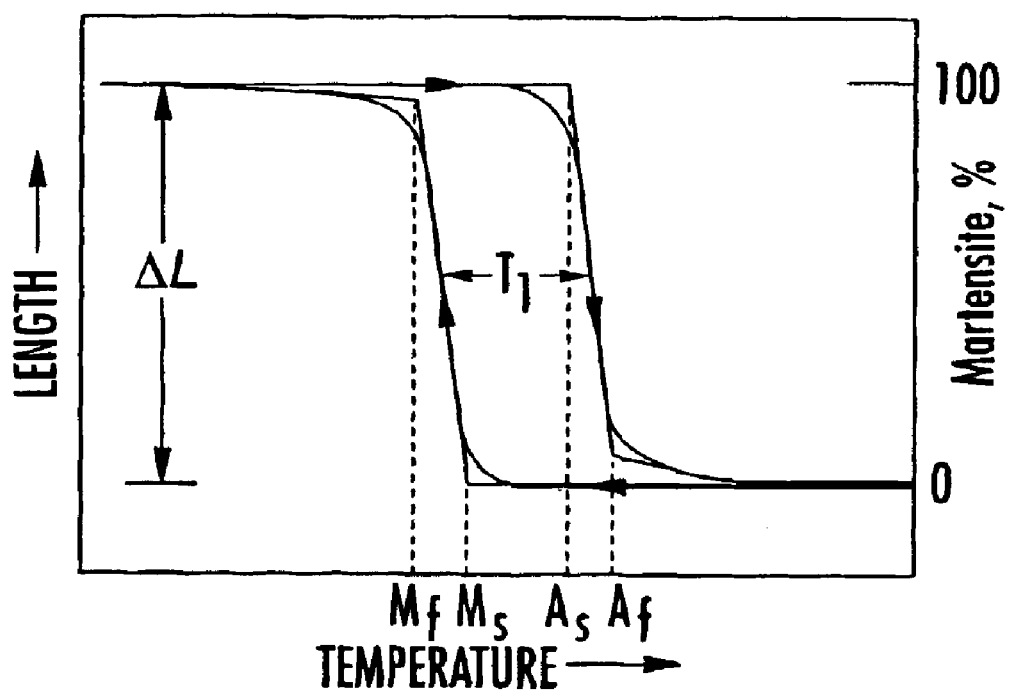
FIG. 35 is a graph showing transformation versus temperature for a specimen under constant load.

FIG. 34 illustrates typical stress-strain curves for shape memory alloy materials in a test set-up (e.g. a wire made of a shape memory alloy). For illustration purposes, curves for pseudoelastic and martensite phases are included (where only one of the pseudoelastic and martensite phases is present for a given material). For a material with an austenite phase present at $T_1$ and a martensite phase at $T_2$, the material can be strained by approximately 3%–8% of its length under low applied stresses. If the temperature of the alloy material is raised above its transition temperature, the material changes to its austenite phase and recovers to its original, underformed shape. This transformation is shown in FIG. 35, in which $A_s$ and $A_f$ represent start and finish points of the austenite phase, respectively; and $M_s$ and $M_f$ represent start and finish points of the martensite phase, respectively.

According to FIG. 35, for a shape memory alloy material at equilibrium in the austenite phase, when a dynamic stress is applied, the material is converted from austenite to martensite as the temperature drops below $M_s$, while the length of the SMA wire increases until the temperature reaches the $M_f$ temperature. As indicated, the transition from the austenite to the martensite phases is reversible. By heating the SMA material, its length decreases between $A_s$ and $A_f$ until the material recovers to its original pre-stressed length.

Figure 36:
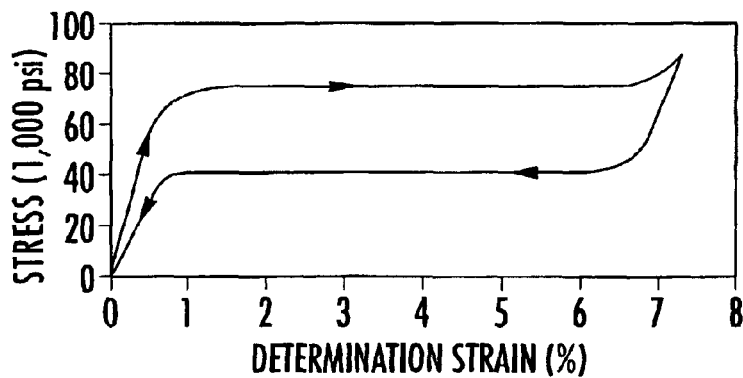
FIG. 36 is a graph showing the pseudoelasticity of shape memory alloys used in accordance with the subject invention.

FIG. 36 illustrates the property of pseudoelasticity, which is present in certain SMAs. For a pseudoelastic alloy material, the pseudoelastic phase is a type of martensite phase in which deformation can occur. As seen in FIG. 36, the material can reversibly strain by up to approximately 8%. As with non-pseudoelastic materials, the pseudoelastic alloy follows a different return path to the austenite phase, indicating that the material absorbs energy during the transformation.

Figure 37:
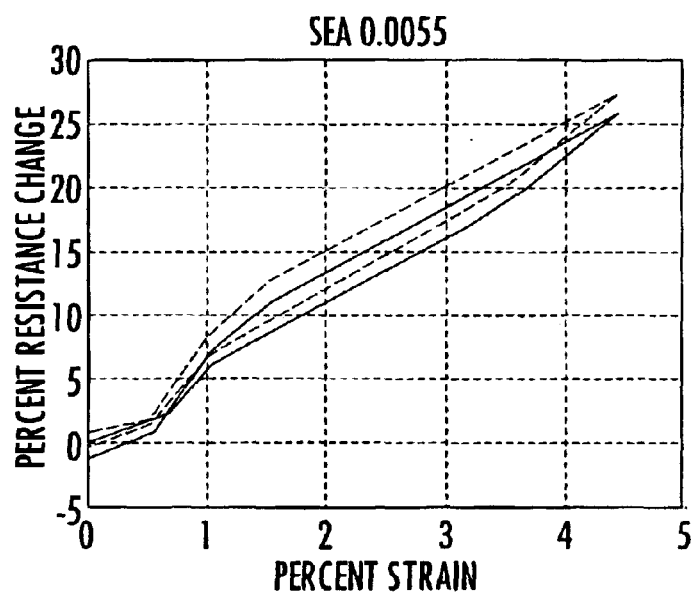
FIGS. 37–38 are graphs showing wire resistance as a function of strain for various pseudoelastic shape memory alloys useful in accordance with the subject invention.

Because pseudoelastic alloys and shape memory alloys exhibit measurable changes of resistance when strained, such alloys are suitable for use in strain gauges/sensors. FIG. 37 depicts the resistance change of a Nitinol wire in a test set-up. A pseudoelastic Nitinol wire 55 cm long and 1 mm in diameter was clamped at either end, and stresses were applied which produced the strain levels indicated on the graph. A change of resistance was measured using conventional strain measurement techniques, e.g. by subjecting the wire to a current. As indicated in FIG. 37, the Nitinol wire in pseudoelastic form reversibly elongated by approximately 5% without permanent deformation of the wire. Such a wire can be incorporated into the strain gauges of the present invention.

Figure 38:
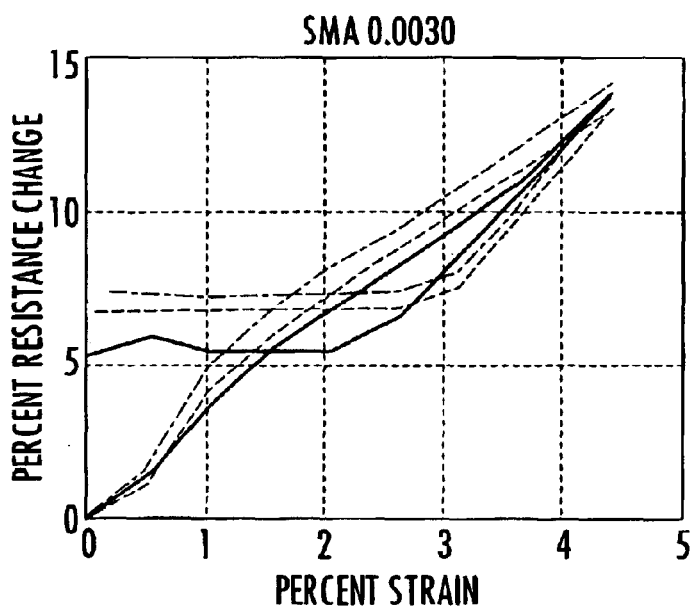

By contrast, FIG. 38 illustrates the resistance change of a non-pseudoelastic shape memory alloy material, in a test set-up similar to that described with reference to FIG. 37. A shape memory Nitinol wire 30 cm long and 1 mm in diameter in the martensite state was tested. The Nitinol wire experienced a change of resistance upon stretching, with a resistance change somewhat less than the pseudoelastic alloy. When strained to a similar threshold as the pseudoelastic wire of FIG. 37, approximately 1.5% of strain was plastic deformation, and could not be recovered without heating the wire. Thus, while non-pseudoelastic shape memory alloys can be used in strain gauges according to the present invention, they must be heated in order to recover any plastic deformation if reuse is desired. Alternatively, such materials can be designed for single use applications such as cargo loading systems in which a load is tested to determine whether any load shifting is acceptable. Generally, pseudoelastic alloys are preferred for reuse applications because they permit maximum strain recovery without plastic deformation.

A strain gauge incorporating a pseudoelastic alloy material functions in a manner similar to conventional strain gauges, except that it is capable not only of measuring small strains in an object, but also medium to large size strains because of the use of a pseudoelastic alloy material. Conventional strain gauges made of typical metals and metal alloys fail upon straining with approximately 0.1–1% elongation, whereas the present invention is directed to strain gauges made of pseudoelastic materials capable of withstanding approximately 8% elongation without permanent deformation.

This invention thus provides an improved sheet-like sensor for measuring stress distribution. The number of electrical connections required to fully analyze the strain experienced by a structural component is seriously reduced because no wires need be connected internally to the sensor to fully analyze the stress distribution. The sensor is capable of detecting the specific location of any strains experienced and is capable of identifying the specific location of a failure. The sensor is able to measure strains of a higher magnitude and can fully predict stress distribution. The method of this invention can be used in connection with the sheet-like sensors disclosed or their equivalents or, indeed, to identify failures of electronic circuitry. A better, less cumbersome, more accurate, and more useful sheet-like sensor is effected by arranging members which change resistance as a function of strain as a grid forming legs between both internal and external nodes but only connecting the resistance measurement means or analyzer to the boundary nodes and then determining all of the leg resistances based on the measured resistance of the legs between the boundary nodes. In this way, there need be no electrical interconnections between the analyzer and the internal nodes of the grid thus seriously reducing the number of electrical interconnections required. Moreover, the specific location of any strains experienced by the sensor can be more accurately detected, the specific location of any failure can be identified, and full stress distribution of a structural member or component underlying the sensor can be predicted. In addition, by using pseudoelastic shape memory alloy material instead of ferromagnetic materials, strains of a higher magnitude can be measured.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. A sheet-like sensor for measuring stress distribution comprising:
   a grid of members which change in resistance when subjected to strain, the members intersecting at internal nodes and intersecting at boundary nodes at the periphery of the grid defining a plurality of legs; and
   an analyzer connected to the boundary nodes and configured to measure any change in resistance of the legs between the boundary nodes and, based on the measured resistances, to calculate any change in resistance in all of the legs.

2. A sheet-like sensor for measuring stress distribution comprising:
   a grid of members which change in resistance when subjected to strain, the grid of members encapsulated in an encapsulation material and intersecting at internal nodes and intersecting at boundary nodes at the periphery of the grid defining a plurality of legs; and
   an analyzer circuit integral with the encapsulation material electrically connected only to the boundary nodes and configured to calculate any change in resistance in all of the legs based solely on the measured resistance of the legs between the boundary node.

3. A sheet-like sensor for measuring stress distribution comprising:
   a grid of members which change in resistance when subjected to strain, the members intersecting at internal nodes and intersecting at boundary nodes at the periphery of the grid defining a plurality of legs; and
   an analyzer connected only to the boundary nodes.

4. The sensor of claim 3 in which the analyzer is configured to:
   a) measure the resistances of the legs between the boundary nodes,
   b) estimate the resistances of all of the legs,
   c) calculate the resistances of all of the legs based on the measured resistances of the legs between the boundary nodes and the estimated resistances of all of the legs,
   d) compare the calculated resistances of the legs between the boundary nodes with the measured resistances of the legs between the boundary nodes,
   e) based on the comparison, re-estimate the resistances of all of the legs; and
   f) iteratively repeat steps c)–e) until the measured resistances of the legs between the boundary nodes converge to the calculated resistances of the legs between the boundary nodes to thus accurately determine the resistances of the legs between or connected to the internal nodes.

5. A sheet-like sensor for measuring stress distribution comprising:
   a grid of members which change in resistance when subjected to strain, the members intersecting at internal nodes and intersecting at boundary nodes at the periphery of the grid defining a plurality of legs; and
   means connected to the boundary nodes, for calculating any change in resistance in all of the legs based solely on the measured resistance of the legs between the boundary nodes.

6. A sheet-like sensor for measuring stress distribution comprising:
   a grid of members which change in resistance when subjected to strain, the members intersecting at internal nodes and intersecting at boundary nodes at the periphery of the grid defining a plurality of legs; and
   an analyzer electrically connected only to the boundary nodes an configured to calculate any change in resistance in all of the legs based solely on the measure resistance of the legs between the boundary nodes.

7. The sensor of claim 6 in which the members are wires or traces.

8. The sensor of claim 7 in which the wires are made of copper.

9. The sensor of claim 7 in which the wires are made of pseudoelastic shape memory alloy material.

10. The sensor of claim 6 in which the grid of members is encapsulated in an encapsulation material.

11. The sensor of claim 10 in which the encapsulation material is Kapton.

12. The sensor of claim 10 in which the analyzer is a circuit integral with the encapsulation material.

13. The sensor of claim 6 in which the grid is in the shape of a polygon.

14. The sensor of claim 13 in which polygon is a rectangle.

15. The sensor of claim 14 in which the rectangle is a square.

16. The sensor of claim 6 in which the analyzer is configured to:
   a) measure the resistances of the legs between the boundary nodes,
   b) estimate the resistances of all of the legs,
   c) calculate the resistances of all of the legs based on the measured resistances of the legs between the boundary nodes and the estimated resistances of all of the legs,
   d) compare the calculated resistances of the legs between the boundary nodes with the measured resistances of the legs between the boundary nodes,
   e) based on the comparison, re-estimate the resistances of all of the legs, and
   f) iteratively repeat steps c)–e) until the measured resistances of the legs between the boundary nodes converge to the calculated resistances of the legs between the boundary nodes to thus accurately determine the resistances of the legs between or connected to the internal nodes.

17. The sensor of claim 16 in which the analyzer is further configured to calculate the strain experience by each leg.

18. The sensor of claim 17 in which the analyzer is further configured to identify any leg which has failed based on a very high determined resistance.

19. The sensor of claim 16 in which the estimate is based on the step a).

20. The sensor of claim 19 in which the estimate is set to the mean of the measured resistances.

21. The sensor of claim 16 in which relaxation is used in step f).

22. A sensor system for measuring stress distribution comprising:
   a grid of members which change in resistance when subjected to strain, the members intersecting at internal nodes and intersecting at boundary nodes at the periphery of the grid defining a plurality of legs; and
   an analyzer electrically connected to the boundary nodes and configured to:
      a) measure the resistances of the legs between the boundary nodes,
      b) estimate the resistances of all of the legs,
      c) calculate the resistances of all of the legs based on the measured resistance of the legs between the boundary nodes and the estimated resistances of all of the legs,
      d) compare the calculated resistances of the legs between the boundary nodes with the measured resistances of the legs between the boundary nodes,
      e) based on the comparison, re-estimate the resistances of all of the legs, and
      f) iteratively repeat steps c)–e) until the measured resistances of the legs between the boundary nodes converge to the calculated resistances of legs between the boundary nodes to thus accurately determine the resistances of the legs between or connected to the internal nodes.

23. A sensor system comprising:
   a grid including internal nodes and boundary nodes at the periphery of the grid defining a plurality of legs; and
   an analyzer electrically connected to the boundary nodes and configured to:
      a) measure a characteristic of the legs between the boundary nodes,
      b) estimate the same characteristic of all of the legs,
      c) calculate the same characteristic of all of the legs base on the measured characteristic of the legs between the boundary nodes and the estimated characteristic of all of the legs,
      d) compare the calculated characteristic of the legs between the boundary nodes with the measured characteristic of the legs between the bound nodes,
      e) based on the comparison, re-estimate the resistances of all of the legs; and
      f) iteratively repeat steps c)–e) until the measured characteristic of the legs between the boundary nodes converge to the calculated characteristic of the legs between the boundary nodes.

24. The sensor system of claim 23 in which the members change in resistance when subjected to strain and the characteristic is resistance.

25. A method for determining impedances in a grid of leg impedances, the legs intersecting at boundary nodes at the periphery of the grid and intersecting at internal nodes within the grid, the method comprising:
   a) measuring the resistances of the legs between the boundary nodes,
   b) estimating the resistances of all of the legs,
   c) calculating the resistances of all of the legs based on the measured resistances of the legs between the boundary nodes and the estimated resistances of all of the legs,
   d) comparing the calculated resistances of the legs between the boundary nodes with the measured resistances of the legs between the boundary nodes,
   e) based on the comparison, re-estimating the resistances of all of the legs, and
   f) iteratively repeating steps c)–e) until the measured resistances of the legs between the boundary nodes converge to the calculated resistances of the legs between the boundary nodes to thus accurately determine the resistance of the legs between or connected to the internal nodes.

26. The method of claim 25 further including the step of calculating the strain experience by each leg.

27. The method of claim 25 further including identifying any leg which has failed based on a very high determined resistance.

28. The method of claim 25 in which the estimate of step b) is based on step a).

29. The method of claim 25 in which the estimate is set to the mean of the measured resistances.

30. The method of claim 25 in which relaxation is used in step f).

31. A sheet-like sensor for measuring stress distribution comprising:
   a grid of wires which change in resistance when subjected to strain, the wires intersecting at internal nodes and intersecting at boundary nodes at the periphery of the grid defining a plurality of legs, the wires encapsulated in an encapsulation material; and an analyzer connected to the boundary nodes and configured to:
- a) measure the resistances of the legs between the boundary nodes,
- b) estimate the resistances of all of the legs,
- c) calculate the resistances of all of the legs based on the measured resistances of the legs between the boundary nodes and the estimated resistances of all of the legs,
- d) compare the calculated resistances of the legs between the boundary nodes with the measured resistances of the legs between the boundary nodes,
- e) based on the comparison, re-estimate the resistances of all of the legs; and
- f) iteratively repeat steps c)–e) until the measured resistances of the legs between the boundary nodes converge to the calculated resistances of the legs between the boundary nodes to thus accurately determine the resistances of the legs between or connected to the internal nodes.

32. A method of measuring stress distribution in a grid of wires which change in resistance when subjected to strain, the wires intersecting at internal nodes and intersecting at boundary nodes at the periphery of the grid defining a plurality of legs, the method comprising:
- a) measuring the resistances of the legs between the boundary nodes,
- b) estimating the resistances of all of the legs,
- c) calculating the resistances of all of the legs based on the measured resistances of the legs between the boundary nodes and the estimated resistances of all of the legs,
- d) comparing the calculated resistances of the legs between the boundary nodes with the measured resistances of the legs between the boundary nodes,
- e) based on the comparison, re-estimating the resistances of all of the legs; and
- f) iteratively repeating steps c)–e) until the measured resistances of the legs between the boundary nodes converge to the calculated resistances of the legs between the boundary nodes to thus accurately determine the resistances of the legs between or connected to the internal nodes.

33. An analysis method comprising:
- a) measuring the resistances of legs of a grid between boundary nodes of said grid;
- b) estimating the resistances of all of the legs;
- c) calculating the resistances of all of the legs based on the measured resistances of the legs between the boundary nodes and the estimated resistances of all of the legs;
- d) comparing the calculated resistances of the legs between the boundary nodes with the measured resistances of the legs between the boundary nodes;
- e) based on the comparison, re-estimating the resistances of all of the legs; and
- f) iteratively repeating steps c)–e) until the measured resistances of the legs between the boundary nodes converge to the calculated resistances of the legs between the boundary nodes.

34. An analysis method comprising:
- a) measuring a characteristic of legs of a grid between boundary nodes of said grid;
- b) estimating the same characteristic of all of the legs;
- c) calculating the same characteristic of all of the legs based on the measured characteristic of the legs between the boundary nodes and the estimated characteristic of all of the legs;
- d) comparing the calculated characteristic of the legs between the boundary nodes with the measured characteristic of the legs between the boundary nodes,
- e) based on the comparison, re-estimating the characteristic of all of the legs; and
- f) iteratively repeating steps c)–e) until the measured characteristic of the legs between the boundary nodes converge to the calculated characteristic of the leg between the boundary node.

35. The analysis method of claim 34 in which the characteristic is a complex impedence.

36. A sheet-like sensor for measuring stress distribution comprising:

a grid of members which change in resistance when subjected to strain, the members intersecting at internal nodes and intersecting at boundary nodes at the periphery of the grid defining a plurality of legs; and an analyzer electrically connected only to the boundary nodes and configured to calculate any change in resistance in all of the legs based solely on the measured resistance of the legs between the boundary nodes, said analyzer configured to:
- a) measure the resistances of the legs between the bound nodes,
- b) estimate the resistances of all of the legs,
- c) calculate the resistances of all of the legs based on the measured resistances of the legs between the boundary nodes and the estimated resistances of all of the legs,
- d) compare the calculated resistances of the legs between the boundary nodes with the measured resistances of the legs between the boundary nodes,
- e) based on the comparison, re-estimate the resistances of all of the legs, and
- f) iteratively repeat steps c)–e) until the measured resistances of the legs between the boundary nodes converge to the calculated resistances of the legs between the boundary nodes to thus accurately determine the resistances of the legs between or connected to the internal nodes.

37. The sensor of claim 36 in which the analyzer is further configured to calculate the strain experience by each leg.

38. The sensor of claim 37 in which the analyzer is further configured to identify any leg which has failed based on a very high determined resistance.

39. The sensor of claim 36 in which the estimate is based on the step a).

40. The sensor of claim 39 in which the estimate is set to the mean of the measured resistances.

41. The sensor of claim 36 in which relaxation is used in step f).

42. A sheet-like sensor for measuring stress distribution comprising:

a grid of members which change in resistance when subjected to strain, the members intersecting at internal nodes and intersecting at boundary nodes at the periphery of the grid defining a plurality of legs; and an analyzer connected only to the boundary nodes, said analyzer configured to:
  a) measure the resistances of the legs between the boundary nodes,
  b) estimate the resistances of all of the legs,
  c) calculate the resistances of all of the legs based on the measured resistances of the legs between the boundary nodes and the estimated resistances of all of the legs,
  d) compare the calculated resistances of the legs between the boundary nodes with the measured resistances of the legs between the boundary nodes,
  e) based on the comparison, re-estimate the resistances of all of the legs, and
  f) iteratively repeat steps c)–e) until the measured resistances of the legs between the boundary nodes converge to the calculated resistances of the legs between the boundary nodes to thus accurately determine the resistances of the legs between or connected to the internal nodes.

* * * * *